US012613611B2

(12) United States Patent
    Jaeger

(10) Patent No.: US 12,613,611 B2
(45) Date of Patent: Apr. 28, 2026

(54) LINEAR AND NON-LINEAR RANGE-BASED PLOT PANE SELECTION

(71) Applicant: AGILENT TECHNOLOGIES, INC., Santa Clara, CA (US)

(72) Inventor: Rainer Jaeger, Rastatt (DE)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 99 days.

(21) Appl. No.: 18/099,166

(22) Filed: Jan. 19, 2023

(65) Prior Publication Data
    US 2024/0248580 A1      Jul. 25, 2024

(51) Int. Cl.
    *G06F 3/048*       (2013.01)
    *G06F 3/0482*      (2013.01)
    *G06F 3/04845*     (2022.01)

(52) U.S. Cl.
    CPC ........ G06F 3/0482 (2013.01); G06F 3/04845 (2013.01)

(58) Field of Classification Search
    CPC ........................... G06F 3/0482; G06F 3/04845
    See application file for complete search history.

(56) References Cited

U.S. PATENT DOCUMENTS

| | | | |
|---|---|---|---|
| 4,912,657 A | 3/1990 | Saxton | |
| 5,553,225 A | 9/1996 | Perry | |
| 6,157,381 A | 12/2000 | Bates et al. | |
| 6,204,846 B1 | 3/2001 | Little et al. | |
| 6,252,594 B1 * | 6/2001 | Xia | G06F 3/0485 |
| | | | 715/978 |
| 6,486,896 B1 | 11/2002 | Ubillos | |
| D554,654 S | 11/2007 | Waldeck | |
| D602,036 S | 10/2009 | Kasuya | |
| D623,193 S | 9/2010 | Cameron | |
| 7,853,900 B2 * | 12/2010 | Nguyen | G06Q 20/1235 |
| | | | 715/833 |
| D653,258 S | 1/2012 | Cahill | |
| D685,810 S | 7/2013 | Way, Sr. | |
| 8,601,388 B2 | 12/2013 | Barrios et al. | |
| 8,751,955 B2 | 6/2014 | Deluca et al. | |
| 9,141,267 B2 | 9/2015 | Shah et al. | |
| D749,091 S | 2/2016 | Lee | |
| D755,799 S | 5/2016 | Finnis | |

(Continued)

FOREIGN PATENT DOCUMENTS

| | | |
|---|---|---|
| DE | 102018123442 A1 | 1/2019 |
| EP | 0616283 A2 | 9/1994 |

OTHER PUBLICATIONS

U.S. Office Action—U.S. Appl. No. 29/883,210—mailed Feb. 24, 2026—33 pages.

(Continued)

*Primary Examiner* — Linh K Pham

(57)         ABSTRACT

In some examples, linear and non-linear range-based plot pane selection may include receiving data that is to be displayed. Based on an increase or a decrease in a size of a range selector, a selection of a range of plot panes may be received from a plurality of available plot panes to display the data. Based on the received selection of the range of plot panes, a display of the data may be generated in plot panes included in the range of plot panes. The size of the range selector may be non-linearly proportional to the available plot panes to display the data.

20 Claims, 40 Drawing Sheets

(56) References Cited

U.S. PATENT DOCUMENTS

| | | | |
|---|---|---|---|
| D757,779 S | 5/2016 | Steinfeld | |
| 9,367,227 B1* | 6/2016 | Kim | G06F 3/0488 |
| 9,513,769 B2 | 12/2016 | Baumann et al. | |
| D776,713 S | 1/2017 | Small | |
| 9,652,140 B2* | 5/2017 | Song | G06F 3/04855 |
| D829,732 S | 10/2018 | Jeffrey | |
| D835,119 S | 12/2018 | Okumura | |
| 10,185,488 B2* | 1/2019 | Kosaka | G06F 3/0488 |
| 10,198,171 B2 | 2/2019 | Rinneberg et al. | |
| D900,123 S | 10/2020 | Lopes | |
| D924,909 S | 7/2021 | Nasu | |
| 11,068,146 B2* | 7/2021 | Fitzgerald | G06F 3/04842 |
| 11,073,979 B2 | 7/2021 | Augustine et al. | |
| D943,605 S | 2/2022 | Zheng | |
| D952,671 S | 5/2022 | Ashenden | |
| 12,205,053 B1* | 1/2025 | Goodwin | G06N 7/01 |
| 12,362,338 B2* | 7/2025 | Chaji | H01L 25/167 |
| 2003/0034990 A1 | 2/2003 | Roelofs | |
| 2004/0085364 A1* | 5/2004 | Keely | G06F 3/0488 |
| | | | 715/804 |
| 2007/0300168 A1* | 12/2007 | Bosma | G06F 3/1243 |
| | | | 715/820 |
| 2009/0235194 A1 | 9/2009 | Arndt | |
| 2010/0064374 A1* | 3/2010 | Martin | G16H 40/63 |
| | | | 715/785 |
| 2010/0146435 A1* | 6/2010 | Cros | G06F 3/04855 |
| | | | 715/786 |
| 2010/0251167 A1* | 9/2010 | DeLuca | G06F 3/0485 |
| | | | 345/173 |
| 2011/0087985 A1* | 4/2011 | Buchanan | G06F 3/04847 |
| | | | 715/771 |
| 2012/0023429 A1* | 1/2012 | Medhi | G06F 3/04842 |
| | | | 715/772 |
| 2013/0132872 A1* | 5/2013 | Milirud | H04L 43/045 |
| | | | 715/764 |
| 2014/0040257 A1* | 2/2014 | Chandrasekaran | G06F 16/972 |
| | | | 707/736 |
| 2014/0152669 A1* | 6/2014 | Omiya | G06T 11/206 |
| | | | 345/440.1 |
| 2014/0282739 A1* | 9/2014 | Augustine | H04N 21/4312 |
| | | | 725/52 |
| 2016/0124587 A1* | 5/2016 | Covington | G01R 31/006 |
| | | | 345/440 |
| 2016/0124612 A1* | 5/2016 | Covington | G06F 3/0482 |
| | | | 345/173 |
| 2017/0357664 A1 | 12/2017 | Blair et al. | |
| 2020/0363939 A1* | 11/2020 | Fitzgerald | G06F 3/04845 |
| 2021/0142400 A1* | 5/2021 | Kinker | G06F 3/14 |
| 2021/0264102 A1* | 8/2021 | Zhang | G06F 16/3335 |
| 2022/0027555 A1* | 1/2022 | Dvorak | G06F 3/0486 |
| 2022/0076537 A1* | 3/2022 | Lerner | G07F 17/323 |
| 2023/0419628 A1* | 12/2023 | Favale | G06T 19/20 |

OTHER PUBLICATIONS

Agilent AC Source GUI Overview for 6800-series AC Sources—
Keysight, https://www.youtube.com/watch?v=tb9CMb_9ATU (Year 2014).

Custom Scrollbars in CSS—Shadeed, https://ishadeed.com/article/
custom-scrollbars-css (Year: 2021).

Getting Started Fityk 1.3.1 manual—Fityk, https://fityk.nieto.pl/
getstarted.html (Year: 2021).

* cited by examiner

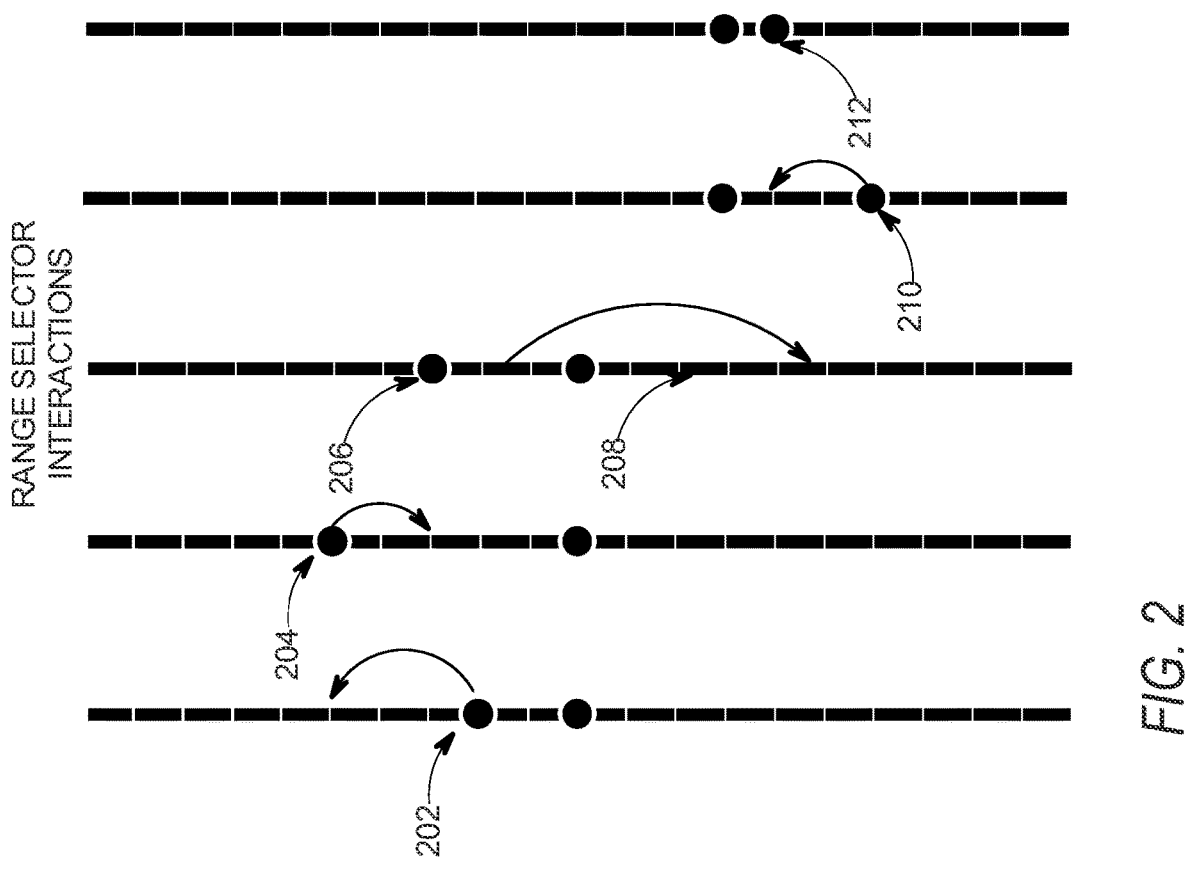
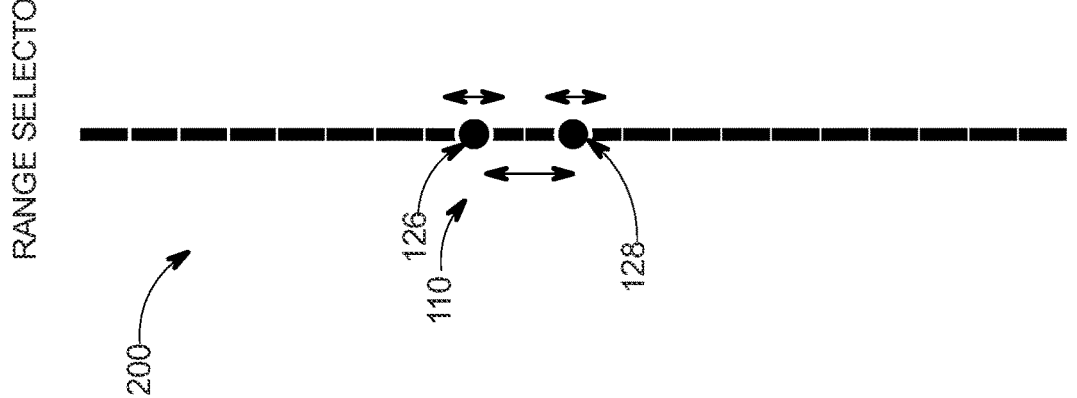
FIG. 2

Linear case (all segments have the same size)

410

412

414

0.2 0.4 0.6 0.8 1 1 1 0.8 0.6 0.4 0.2

$\Sigma = 7$

Minimum active segment size: 20px 4 8 12 16 20 20 20 16 12 8 4

$\Sigma = 140px$

Size inactive = (300px – 140px)/(75 – 11) = 160px/64 = 2.5px

Non-linear case (active/activatable segments have larger size than inactive segments)

2.5    2.5

2.5  4  8  12  16  20  20  20  16  12  8  4  2.5

Legend:
Active segment
Activatable segment
Inactive segment

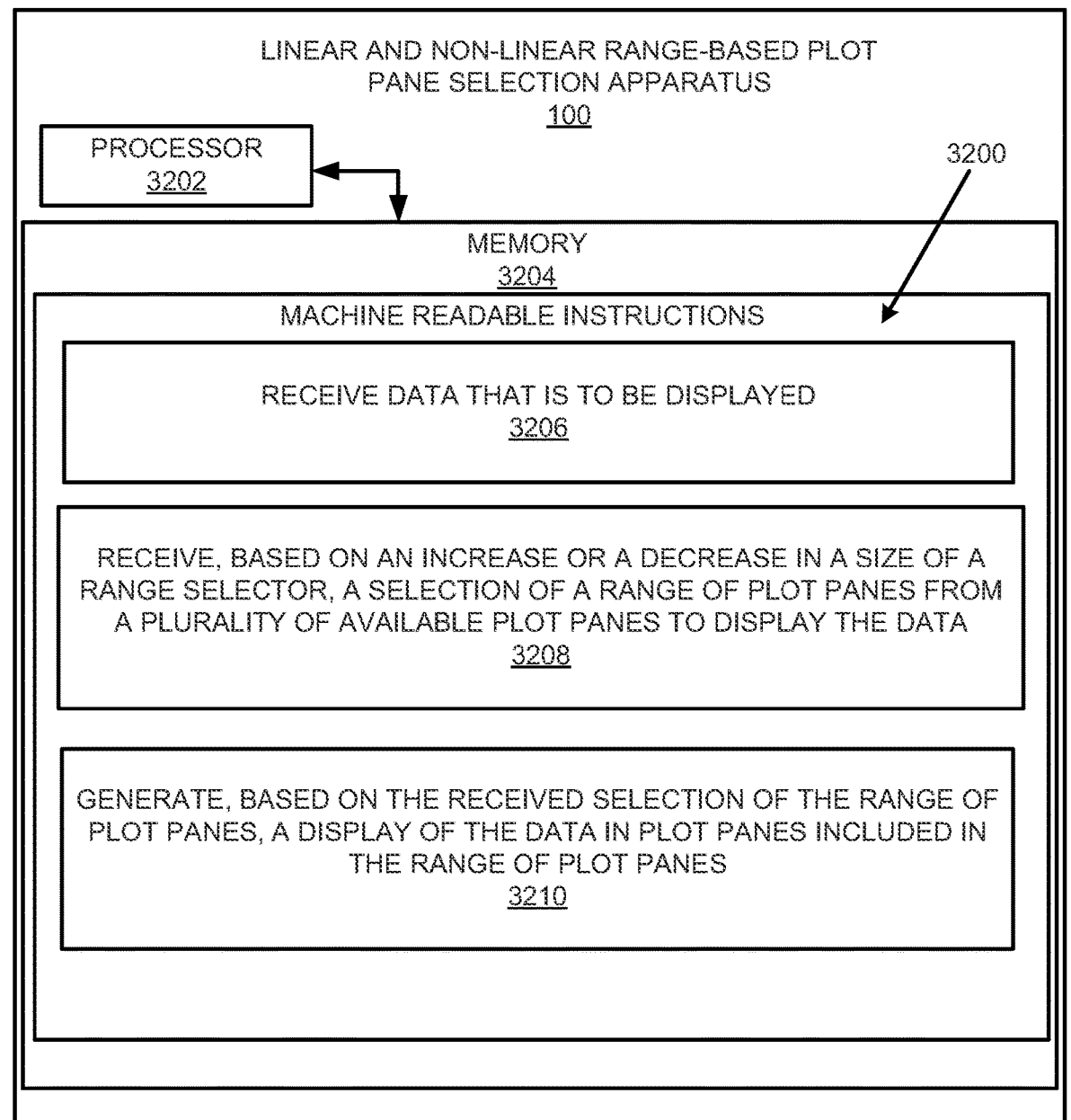

LINEAR AND NON-LINEAR RANGE-BASED PLOT
PANE SELECTION APPARATUS
100

PROCESSOR
3202

3200

MEMORY
3204

MACHINE READABLE INSTRUCTIONS

RECEIVE DATA THAT IS TO BE DISPLAYED
3206

RECEIVE, BASED ON AN INCREASE OR A DECREASE IN A SIZE OF A
RANGE SELECTOR, A SELECTION OF A RANGE OF PLOT PANES FROM
A PLURALITY OF AVAILABLE PLOT PANES TO DISPLAY THE DATA
3208

GENERATE, BASED ON THE RECEIVED SELECTION OF THE RANGE OF
PLOT PANES, A DISPLAY OF THE DATA IN PLOT PANES INCLUDED IN
THE RANGE OF PLOT PANES
3210

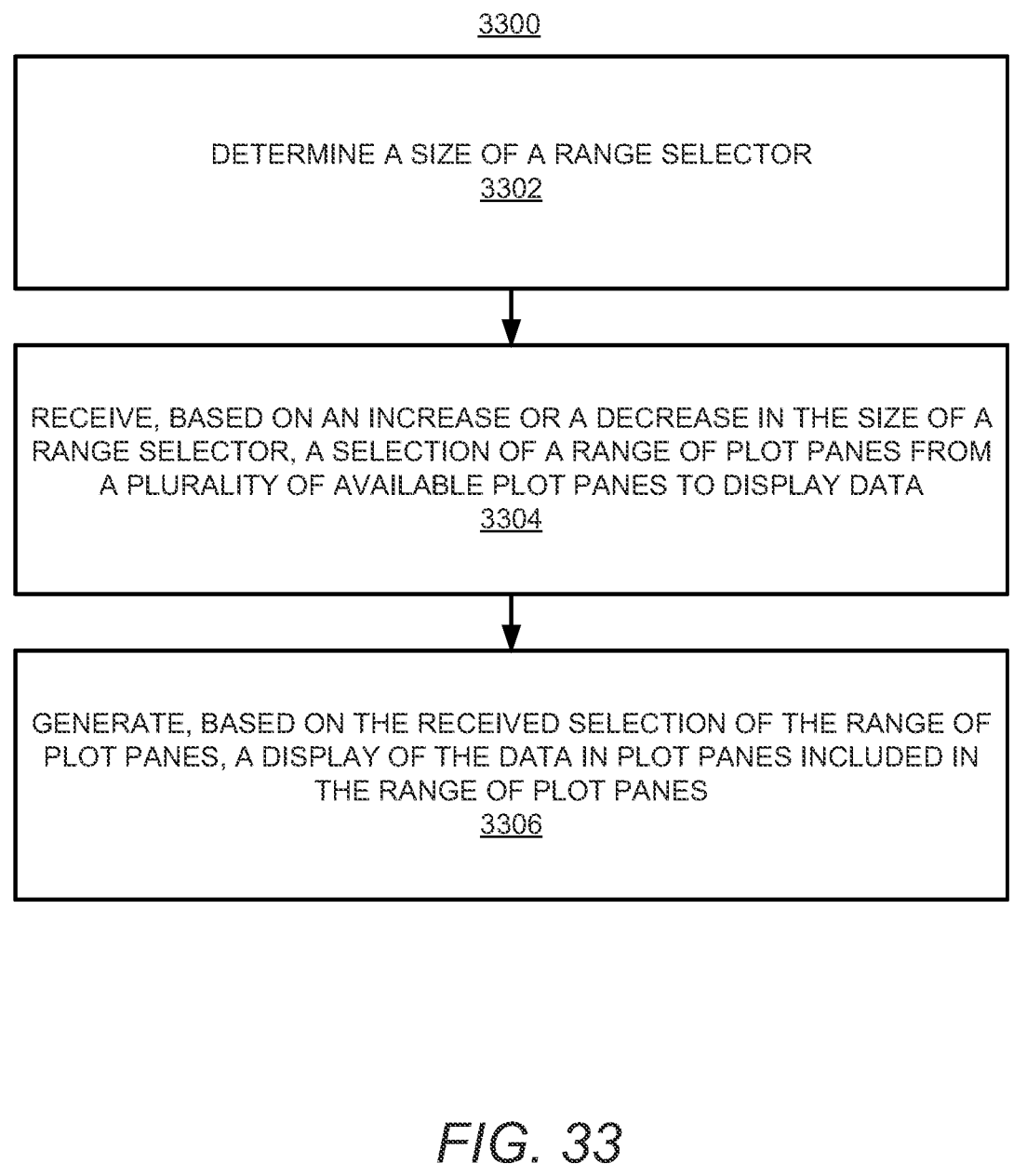

DETERMINE A SIZE OF A RANGE SELECTOR
3302

RECEIVE, BASED ON AN INCREASE OR A DECREASE IN THE SIZE OF A RANGE SELECTOR, A SELECTION OF A RANGE OF PLOT PANES FROM A PLURALITY OF AVAILABLE PLOT PANES TO DISPLAY DATA
3304

GENERATE, BASED ON THE RECEIVED SELECTION OF THE RANGE OF PLOT PANES, A DISPLAY OF THE DATA IN PLOT PANES INCLUDED IN THE RANGE OF PLOT PANES
3306

*FIG. 33*

LINEAR AND NON-LINEAR RANGE-BASED PLOT PANE SELECTION

BACKGROUND

Data may be evaluated on a user interface display, for example, by plotting the data in a graph format. In some cases, a plurality of graphs may be visualized in separate plot panes on the user interface display. Each of the plot panes may be manipulated by utilizing a variety of techniques.

BRIEF DESCRIPTION OF DRAWINGS

Features of the present disclosure are illustrated by way of example and not limited in the following figure(s), in which like numerals indicate like elements, in which:

FIG. 2 illustrates operation of a range selector to illustrate operation of the linear and non-linear range-based plot pane selection apparatus of FIG. 1, in accordance with an example of the present disclosure;

FIG. 32 illustrates an example block diagram for linear and non-linear range-based plot pane selection, in accordance with an example of the present disclosure;

FIG. 33 illustrates a flowchart of an example method for linear and non-linear range-based plot pane selection, in accordance with an example of the present disclosure.

DETAILED DESCRIPTION

Figure 1:
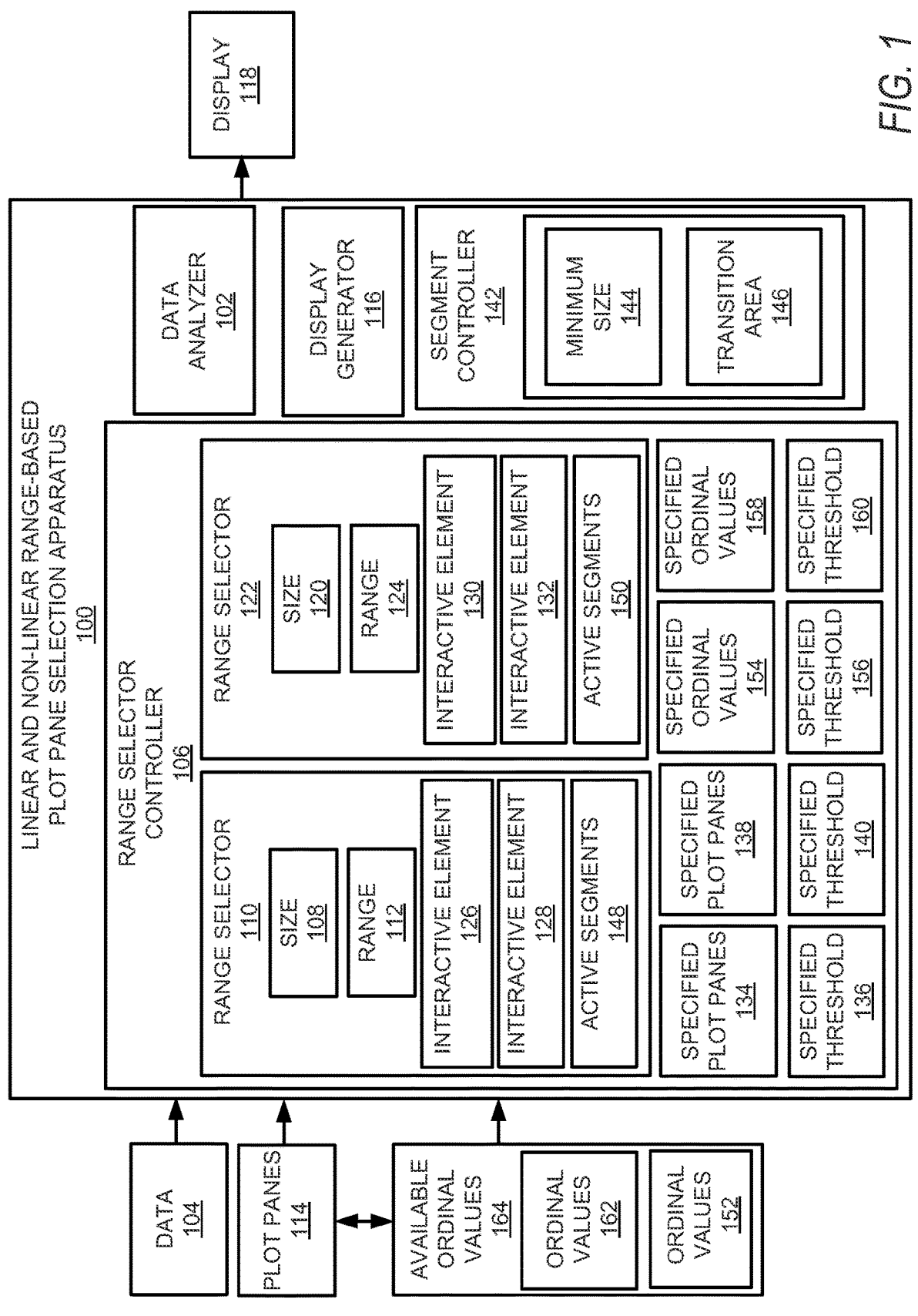
FIG. 1 illustrates a layout of a linear and non-linear range-based plot pane selection apparatus, in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Apparatuses for linear and non-linear range-based plot pane selection, methods for linear and non-linear range-based plot pane selection, and non-transitory computer readable media having stored thereon machine readable instructions to provide linear and non-linear range-based plot pane selection are disclosed herein.

With respect to data analysis, such as analysis of signal traces, one technique of data analysis may include viewing of the data in separate plot panes. A plot pane may be described as a graph including boundaries within which the data may be plotted as needed. The plot panes may be displayed on a user interface display that may include scrollbar "thumbs" that are provided, for example, on vertical and horizontal axes. A user may move the scrollbar thumbs as needed to browse through a plurality of plot panes that are not visible, and/or to browse through a single plot plane that has been enlarged to a size that is greater than a size of the user interface display. The number of visible plot panes may also be configured, for example, by utilizing a properties dialog and selecting a number of visible plot panes. In this regard, it is technically challenging to efficiently browse through plot panes and to configure and re-configure a number of visible plot panes.

In order to address at least the aforementioned technical challenges, the apparatuses, methods, and non-transitory computer readable media disclosed herein provide a user control (e.g., a range selector as disclosed herein) to browse through data, and to simultaneous control a number of visible plot panes. The range selector may be utilized to select a small range of plot panes (e.g., visible plot panes, for example, between 1 and 10) out of a relatively large collection of plot panes (e.g., the total number of available plot panes, which may be on the order of hundreds or thousands). The range selector may also be resized (e.g., by utilizing interactive elements to control a number of active segments as disclosed herein), in addition to moving the range selector up, down, left, and right (or in another direction). Yet further, the range selector size may be controlled as disclosed herein with respect to a segment controller to allow finger or touch device based operation of the associated interactive elements.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example linear and non-linear range-based plot pane selection apparatus (hereinafter also referred to as "apparatus 100").

Referring to FIG. 1, the apparatus 100 may include a data analyzer 102 that is executed by at least one hardware processor (e.g., the hardware processor 3202 of FIG. 32, and/or the hardware processor 3404 of FIG. 34) to receive data 104 that is to be displayed.

A range selector controller 106 that is executed by at least one hardware processor (e.g., the hardware processor 3202 of FIG. 32, and/or the hardware processor 3404 of FIG. 34) may receive, based on an increase or a decrease in a size 108 of a range selector 110, a selection of a range 112 of plot panes from a plurality of available plot panes 114 to display the data 104. In some examples, the plurality of available plot panes 114 may represent a total number of plot panes available to display the data 104. In other examples, the plurality of available plot panes 114 may represent a number of plot panes of in a row of plot panes, or a column of plot panes to display the data 104.

A display generator 116 that is executed by at least one hardware processor (e.g., the hardware processor 3202 of FIG. 32, and/or the hardware processor 3404 of FIG. 34) may generate, based on the received selection of the range 112 of plot panes, a display 118 of the data 104 in plot panes included in the range 112 of plot panes.

According to examples disclosed herein, the size 108 of the range selector 110 may be non-linearly proportional to the available plot panes 114 to display the data 104.

According to examples disclosed herein, the range selector 110 may represent a first range selector 110 to control display of a row of the plot panes included in the range 112 of plot panes. The range selector controller 106 may receive, based on an increase or a decrease in a size 120 of a second range selector 122, a selection of a column of plot panes included in another range 124 of plot panes. The display generator 116 may generate, based on the received selection of the another range 124 of plot panes, a further display (e.g., included in the display 118) of the data 104 in plot panes included in the another range 124 of plot panes. In a similar manner, for a three or multi-dimensional display 118, the range selector controller 106 may implement further range selectors to generate further displays of the data 104 as needed.

According to examples disclosed herein, the size of the second range selector 122 may be non-linearly proportional to the available plot panes 114 to display the data 104 with respect to the column of plot panes.

According to examples disclosed herein, the range selector 110 may include oppositely displayed interactive elements 126 and 128 to increase or decrease the size 108 of the range selector 110. In some examples, each interactive element of the interactive elements 126 and 128 may include a circular configuration. Similarly, the range selector 122 may include oppositely displayed interactive elements 130 and 132 to increase or decrease the size 120 of the range selector 122.

The range selector controller 106 may determine whether a maximum number of specified plot panes 134 is less than or equal to a specified threshold 136. Based on a determination that the maximum number of specified plot panes 134 is less than or equal to the specified threshold 136, the range selector controller 106 may specify the size 108 of the range selector 110 as linearly proportional to the available plot panes 114 to display the data 104. With respect to the range selector 122, the range selector controller 106 may determine whether a maximum number of specified plot panes 138 is less than or equal to a specified threshold 140. Based on a determination that the maximum number of specified plot panes 138 is less than or equal to the specified threshold 140, the range selector controller 106 may specify the size 120 of the range selector 122 as linearly proportional to the available plot panes 114 to display the data 104.

According to examples disclosed herein, the range selector controller 106 may determine whether the maximum number of specified plot panes 134 is greater than the specified threshold 136. Based on a determination that the maximum number of specified plot panes 134 is greater than the specified threshold 136, the range selector controller 106 may specify the size 108 of the range selector 110 as non-linearly proportional to the available plot panes 114 to display the data 104. With respect to the range selector 122, the range selector controller 106 may determine whether the maximum number of specified plot panes 138 is greater than the specified threshold 140. Based on a determination that the maximum number of specified plot panes 138 is greater than the specified threshold 140, the range selector controller 106 may specify the size 120 of the range selector 122 as non-linearly proportional to the available plot panes 114 to display the data 104.

In order to specify the non-linear proportionality of the size 108 (or 120) of the range selector 110 (or 122), a segment controller 142 that is executed by at least one hardware process (e.g., the hardware processor 3202 of FIG. 32, and/or the hardware processor 3404 of FIG. 34) may determine a minimum size 144 for active segments associated with plot panes. The segment controller 142 may determine a transition area 146 in a vicinity of active segments 148 associated with the range 112 of plot panes. The segment controller 142 may modify, based on a comparison of a size of the active segments 148 associated with the range 112 of plot panes and a size of inactive segments to the minimum size 144 for active segments associated with the plot panes, the transition area 146. The segment controller 142 may perform a similar analysis and modification (if needed) with respect to active segments 150 associated with the range 124 of plot panes.

According to examples disclosed herein, the segment controller 142 may determine the minimum size 144 for active segments associated with the plot panes by determining the minimum size to enable a touch device based input from the interactive elements 126 and 128 of the range selector 110 associated with the range 112 of plot panes. Alternatively or additionally, the segment controller 142 may determine the minimum size 144 to enable a user contact based input from the interactive elements 126 and 128 of the range selector 110 associated with the range 112 of plot panes. The segment controller 142 may perform a similar analysis with respect to the interactive elements 130 and 132 associated with the range 124 of plot panes.

According to examples disclosed herein, the range selector controller 106 may receive, based on an increase or a decrease in a size 108 of the range selector 110, a selection of a range 112 of ordinal values 162 associated with plot panes from a plurality of available ordinal values 164 associated with plot panes to display data 104. The display generator 116 may generate, based on the received selection of the range 112 of ordinal values 162, the display 118 of the data in plot panes included in the range 112 of ordinal values 162 associated with the plot panes.

According to examples disclosed herein, the size of the range selector 110 may be non-linearly proportional to the available ordinal values 164 associated with the plot panes to display the data 104.

According to examples disclosed herein, the range selector 110 may represent a first range selector 110 to control display of a row of the plot panes included in the range 112 of ordinal values 162 associated with the plot panes. The range selector controller 106 may receive, based on an increase or a decrease in a size of the second range selector 122, a selection of a column of plot panes included in another range 124 of ordinal values 152 associated with plot panes. The display generator 116 may generate, based on the received selection of the another range 124 of ordinal values 152 associated with the plot panes, a further display of the data in plot panes included in the another range of ordinal values 152 associated with the plot panes.

According to examples disclosed herein, the range selector controller 106 may determine whether a maximum number of specified ordinal values 154 associated with plot panes is less than or equal to a specified threshold 156. Based on a determination that the maximum number of specified ordinal values 154 associated with the plot panes is less than or equal to the specified threshold 156, the range selector controller 106 may specify the size 108 of the range selector 110 as linearly proportional to the available ordinal values 164 associated with plot panes to display the data 104. Similarly, the range selector controller 106 may determine whether a maximum number of specified ordinal values 158 associated with plot panes is less than or equal to a specified threshold 160. Based on a determination that the maximum number of specified ordinal values 158 associated with the plot panes is less than or equal to the specified threshold 160, the range selector controller 106 may specify the size 120 of the range selector 122 as linearly proportional to the available ordinal values 164 associated with plot panes to display the data 104.

According to examples disclosed herein, the range selector controller 106 may determine whether a maximum number of specified ordinal values 154 associated with plot panes is greater than the specified threshold 156. Based on a determination that the maximum number of specified ordinal values 154 associated with the plot panes is greater than the specified threshold 156, the range selector controller 106 may specify the size 108 of the range selector 110 as non-linearly proportional to the available ordinal values 164 associated with plot panes to display the data 104. Similarly, the range selector controller 106 may determine whether a maximum number of specified ordinal values 158 associated with plot panes is greater than the specified threshold 160. Based on a determination that the maximum number of specified ordinal values 158 associated with the plot panes is greater than the specified threshold 160, the range selector controller 106 may specify the size 120 of the range selector

122 as non-linearly proportional to the available ordinal values 164 associated with plot panes to display the data 104.

According to examples disclosed herein, the segment controller 142 may determine a minimum size 144 for active segments associated with plot panes. The segment controller 142 may determine a transition area 146 in a vicinity of active segments 148 associated with the range 112 of ordinal values associated with the plot panes. The segment controller 142 may modify, based on a comparison of a size of the active segments 148 associated with the range 112 of ordinal values associated with the plot panes and a size of inactive segments to the minimum size 144 for active segments associated with the plot panes, the transition area 146. The segment controller 142 may perform a similar analysis and modification (if needed) with respect to the active segments 150 associated with the range 124 of plot panes.

According to examples disclosed herein, the segment controller 142 may determine the minimum size for active segments associated with the plot panes by determining the minimum size to enable a touch device based input from interactive elements 126 and 128 associated with the range 112 of ordinal values associated with the plot panes, and/or enable a user contact based input from the interactive elements 126 and 128 associated with the range 112 of ordinal values associated with the plot panes. The segment controller 142 may perform a similar analysis with respect to the interactive elements 130 and 132 associated with the range 124 of plot panes.

Operation of the apparatus 100 is described in further detail with reference to FIGS. 1-31.

FIG. 2 illustrates operation of a range selector (e.g., the range selector 110 or 122) to illustrate operation of the apparatus 100, in accordance with an example of the present disclosure.

Referring to FIG. 2, as shown at 200 the range selector 110 (or 122) may be utilized to change a number of active segments (e.g., a number of visible plot panes). For example, as shown at 202 and 204, the interactive element 126 may be dragged upwards in the orientation of FIG. 2 to increase a number of active segments (shown as rectangular blocks between the interactive elements) from two to five. As shown at 204 and 206, the interactive element 126 may be dragged downwards in the orientation of FIG. 2 to decrease a number of active segments from five to three. Further, the range selector 110 may be dragged downwards to display the inactive segments at 208. As shown at 210 and 212, the interactive element 128 may be dragged upwards in the orientation of FIG. 2 to decrease a number of active segments from three to one. Thus, the range selector 110 (or 122) may be utilized to drag the active segments (e.g., browse through the invisible plot panes), as well as to increase or decrease a number of active segments.

Figure 3:
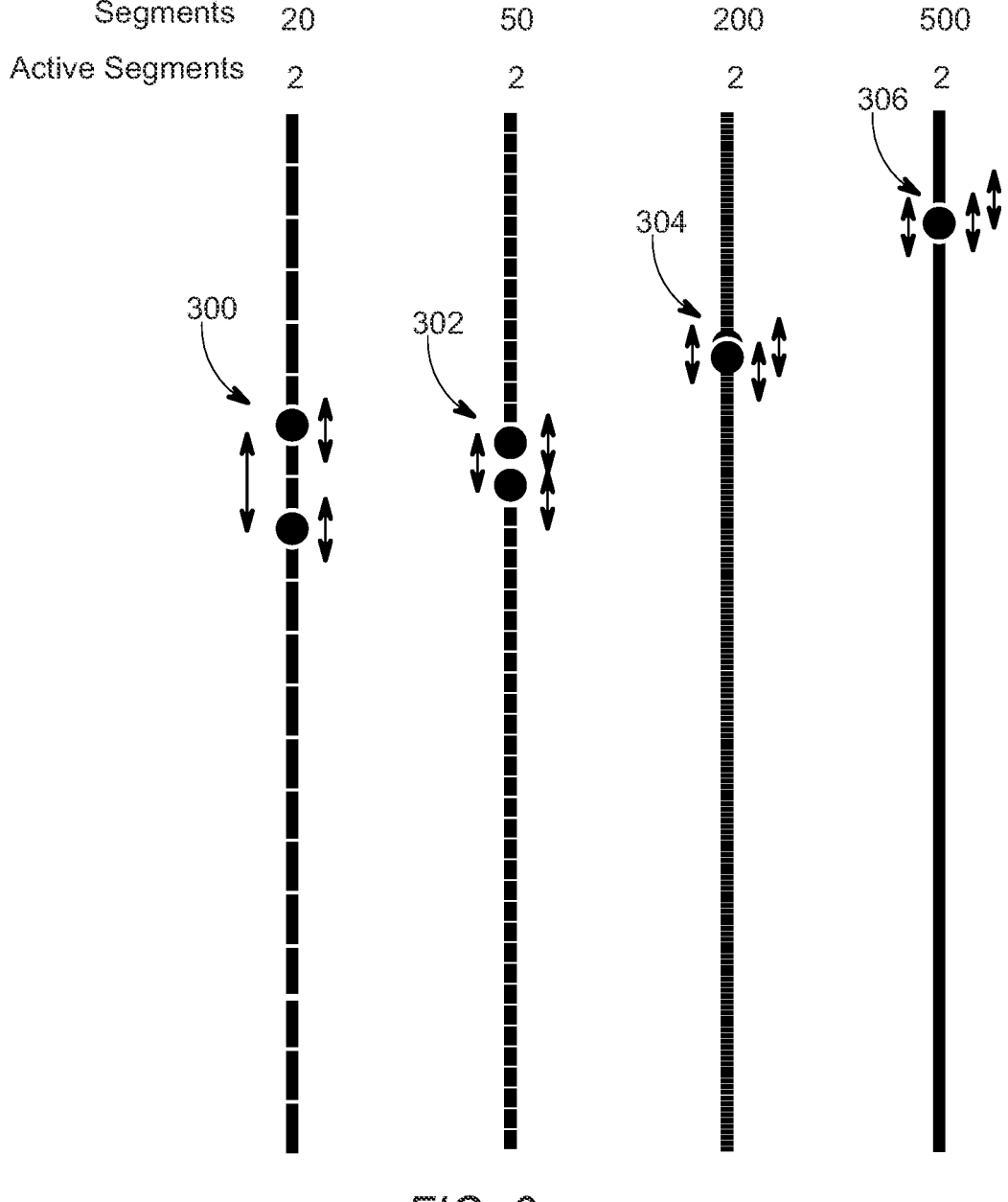
FIG. 3 illustrates operation of the range selector of FIG. 2 with respect to different numbers of segments, in accordance with an example of the present disclosure.

FIG. 3 illustrates operation of the range selector 110 (or 122) of FIG. 2 with respect to different numbers of segments, in accordance with an example of the present disclosure.

Referring to FIG. 3, as shown at 300, 302, 304, and 306, the range selector 110 (and 122) is respectively shown for two active segments out of a total number of 20, 50, 200, and 500 segments. In this regard, absent implementation of the segment controller 142 as disclosed herein, for a relatively large number of segments (e.g., greater than 50), the interactive elements 126 and 128 (or the interactive elements 130 and 132) may begin to overlap.

Figure 4A:
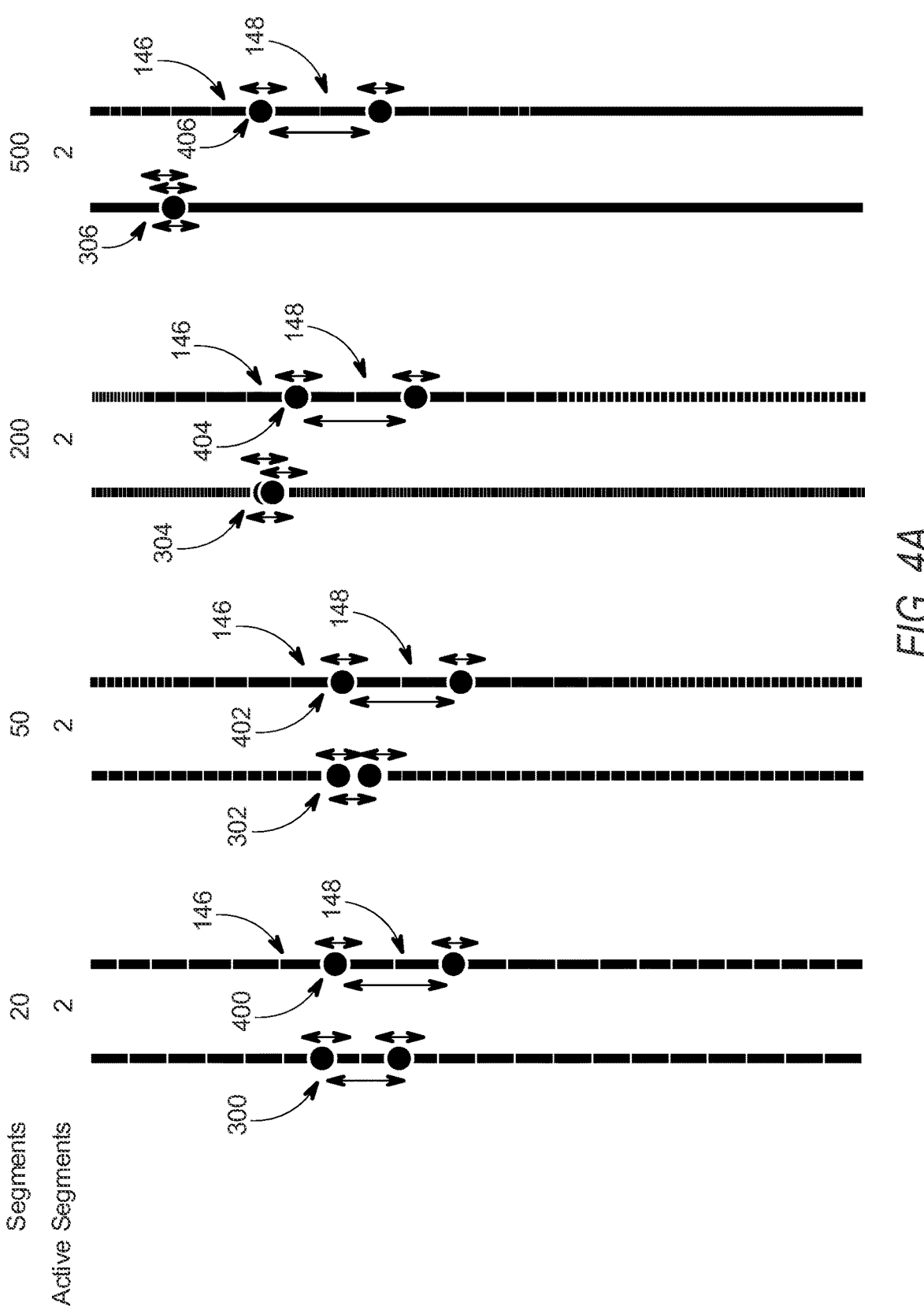
FIG. 4A illustrates a non-linear operation of the range selector of FIG. 2 with respect to different numbers of segments, in accordance with an example of the present disclosure.

FIG. 4A illustrates a non-linear operation of the range selector 110 (or 122) of FIG. 2 with respect to different numbers of segments, in accordance with an example of the present disclosure.

Referring to FIGS. 1 and 4, as disclosed herein, in order to specify the non-linear proportionality of the size 108 (or 120) of the range selector 110 (or 122), the segment controller 142 may determine a minimum size 144 (e.g., two for the example of FIG. 4A) for active segments associated with plot panes. The segment controller 142 may determine a transition area 146 in a vicinity of active segments 148 associated with the range 112 of plot panes. The segment controller 142 may modify, based on a comparison of a size of the active segments 148 associated with the range 112 of plot panes and a size of inactive segments to the minimum size 144 for active segments associated with the plot panes, the transition area 146. In this regard, as shown in FIG. 4A at 400, 402, 404, and 406, the range selector 110 (and 122) is respectively shown for two active segments out of a total number of 20, 50, 200, and 500 segments. Compared to FIG. 3, with the implementation of the segment controller 142, for a relatively large number of segments (e.g., greater than 50), the interactive elements 126 and 128 (or the interactive elements 130 and 132) include two segments therebetween.

Thus, compared to the example of FIG. 3, for FIG. 4A, the range selector 110 (or 122) may be operable (irrespective of the number of segments). For example, for the segment controller 142, the minimum size 144 for active segments and the transition area 146 may be defined in the vicinity of the active segments in which the segment size continuously adapts from the size of the active segments, which may be relatively small, to the size of the inactive segments. This adaptation may lead to a magnifying glass effect, showing the active segments and the segments near the active segments in more detail (e.g., larger). Based on the magnifying effect, the range selector 110 (and 122) may be equally operable irrespective of the number of segments. Similarly, the range selector 110 (and 122) may be operated with a finger or another touch device as all interactive elements (e.g., 126, 128, 130, 132) are sufficiently separated.

Figure 4B:
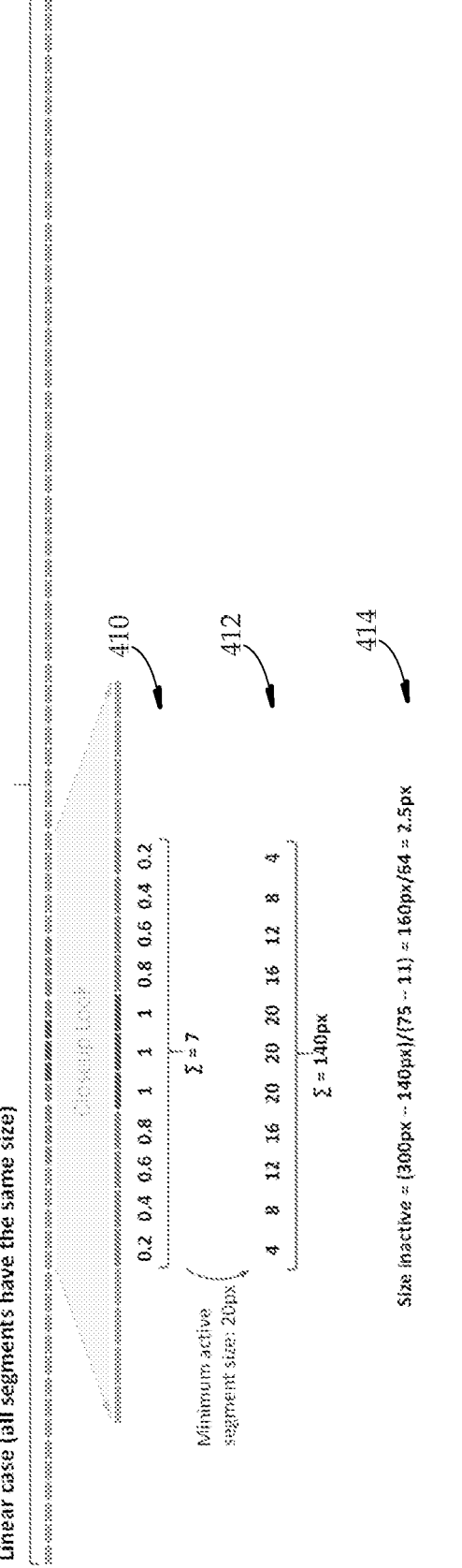
FIG. 4B illustrates an example of modification of a transition area, in accordance with an example of the present disclosure.

With respect to modification of the transition area 146 by the segment controller 142 as disclosed herein, FIG. 4B illustrates an example case that includes a total width of 300 pixels (e.g., 300 px), a segment count of 75, and a segment width of 4 pixels (e.g., 4 px; linear case). In this regard, at 410, relative sizes of active and activatable (e.g., segments near the active segments) segments may be specified as shown. At 412, an absolute size of the active and activatable segments may be determined by multiplying the relative sizes with the specified minimum size of the active segments. At 414, the size of the inactive segments may be determined by distributing the remaining space evenly, for example, as follows for the example of FIG. 4B: (300 px−140 px)/(75−11)=160 px/64=2.5 px.

Figure 4C:
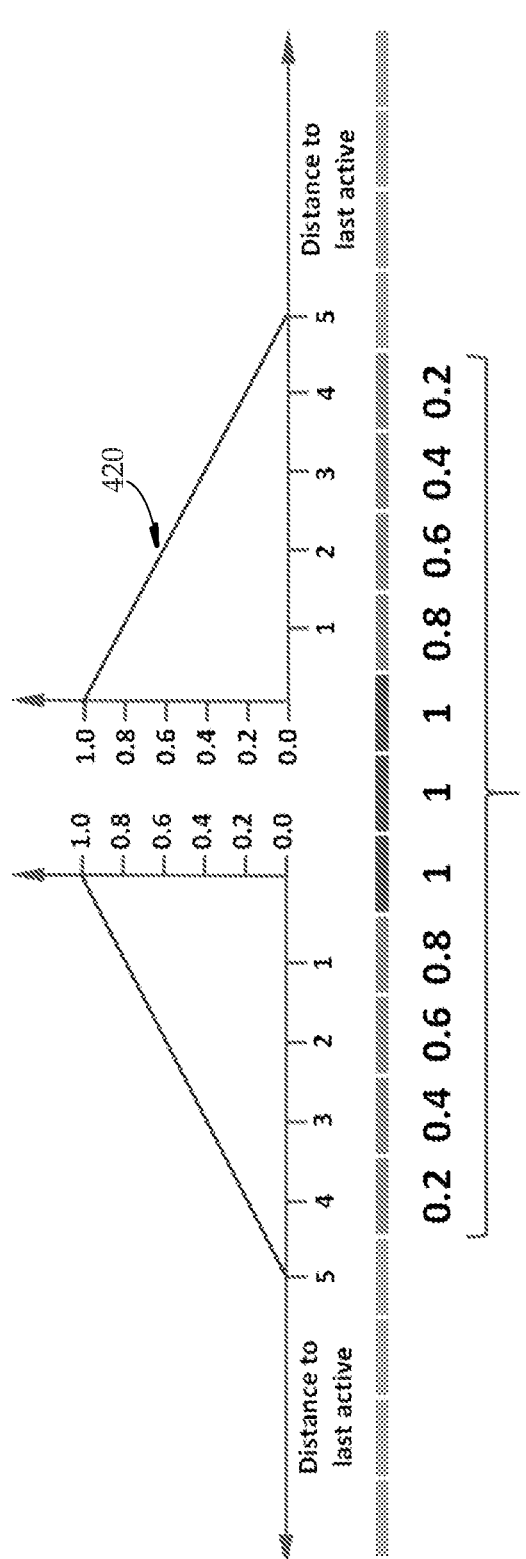
FIG. 4C illustrates determination of relative active and activatable segment sizes, in accordance with an example of the present disclosure.

Referring to FIG. 4C, with respect to determination of the relative active and activatable segment sizes, the relative segment size may be inversely proportional as shown at 420 to the distance of the activatable segment to the last active segment, under the consideration that the first inactive segment is assigned a relative size of zero.

Figure 4D:
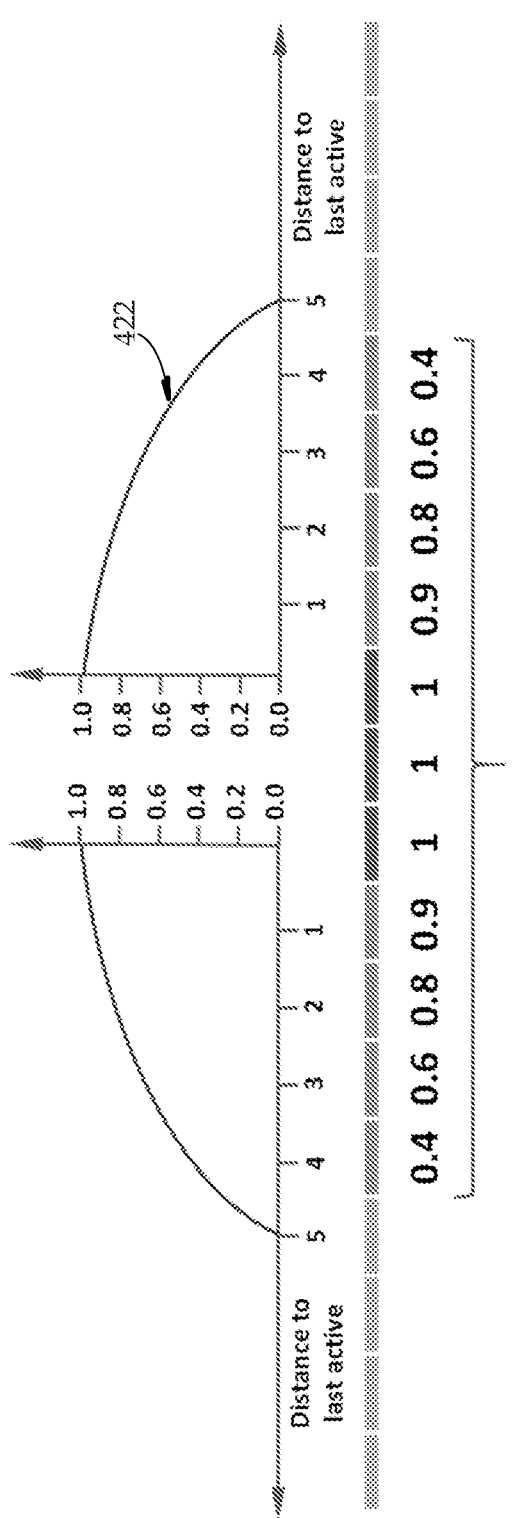
FIG. 4D an operation to determine relative segment sizes, in accordance with an example of the present disclosure.

Referring to FIG. 4D, in addition to use a linearly reciprocal distribution of relative segment sizes as depicted in FIG. 4C, another monotone operation as shown in FIG. 4D at 422 may be utilized.

Figure 5:
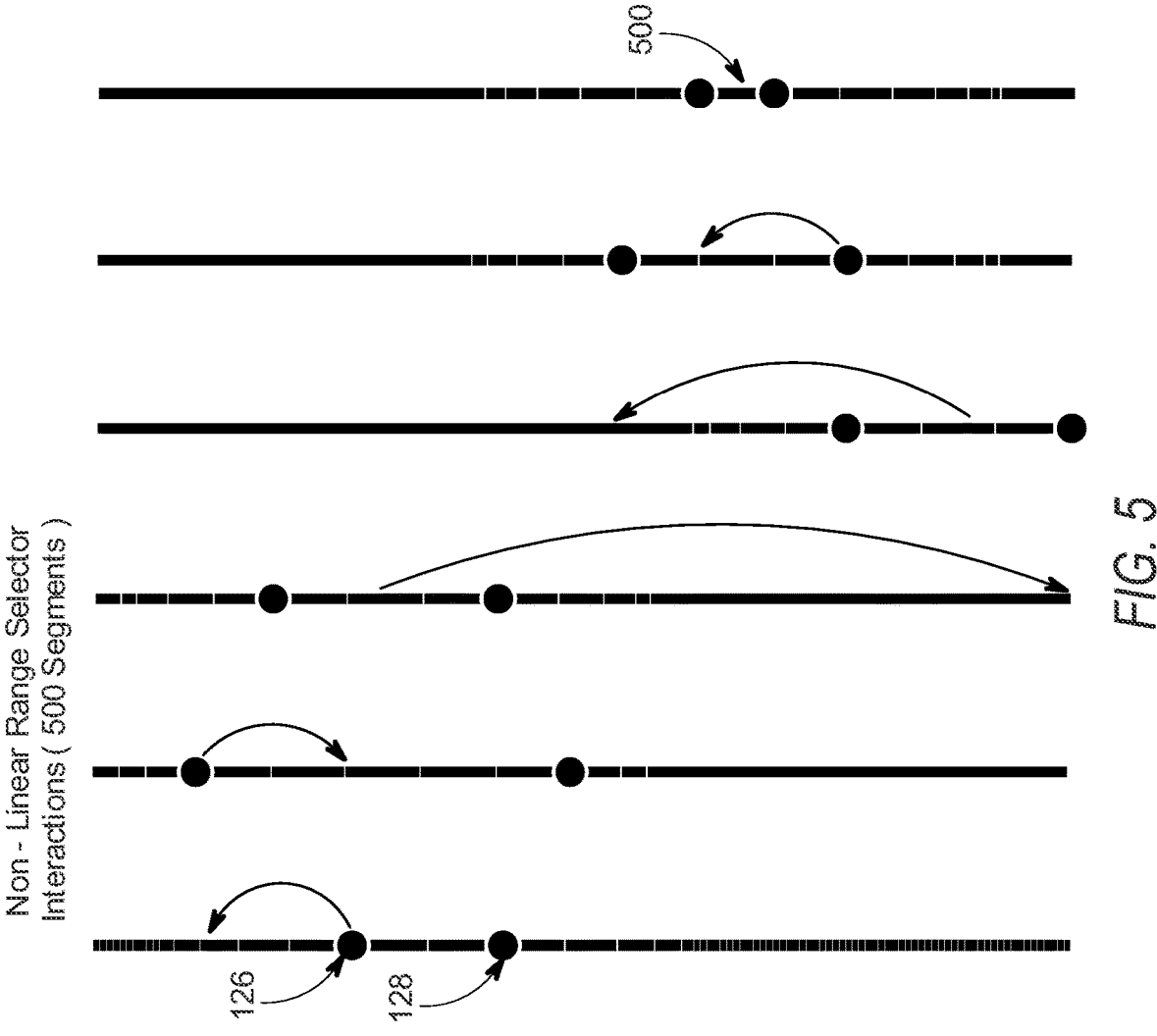
FIG. 5 illustrates a non-linear operation of the range selector of FIG. 2 with respect to a specified number of segments, in accordance with an example of the present disclosure.

FIG. 5 illustrates a non-linear operation of the range selector 110 (and 122) of FIG. 2 with respect to a specified number of segments, in accordance with an example of the present disclosure.

Referring to FIG. 5, a non-linear operation of the range selector 110 (and 122) of FIG. 2 with respect to 500 segments is shown. In this regard, irrespective of the movement of the interactive elements 126 or 128, the minimum size 144 for active segments remains at one, for example, as shown at 500.

FIGS. 6-17 illustrate a user interface display to illustrate operation of the apparatus 100 for a set of specifications associated with the range selectors 110 and 122, in accordance with an example of the present disclosure.

Figure 6:
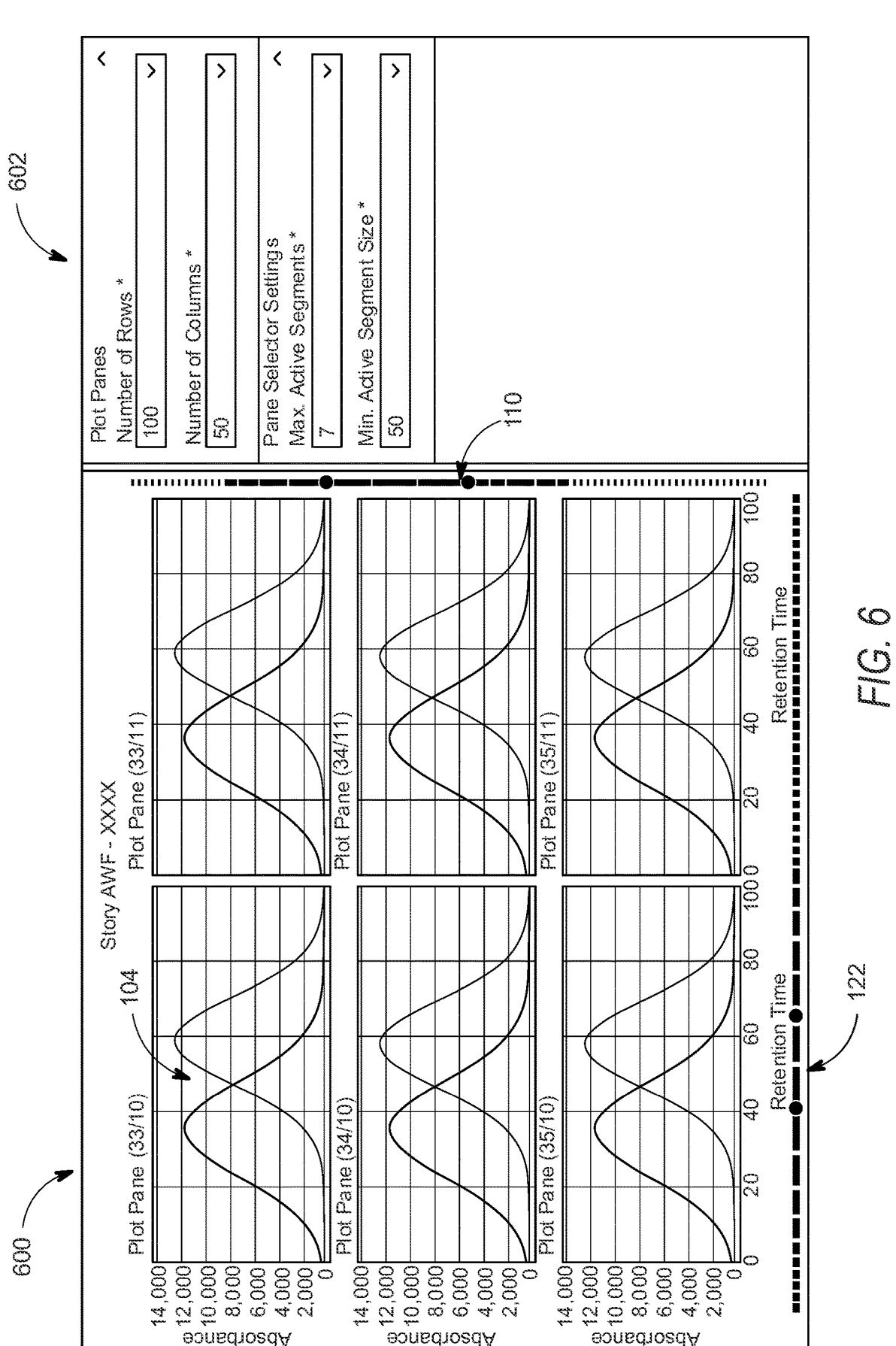
FIGS. 6-17 illustrate a user interface display to illustrate operation of the linear and non-linear range-based plot pane selection apparatus of FIG. 1, for a set of specifications associated with the range selectors, in accordance with an example of the present disclosure.

Referring to FIG. 6, the user interface display 600 shows an example of operation of the range selectors 110 and 122. As shown at 602, a maximum number of rows of plot panes may be specified at 100, and a maximum number of columns of plot panes may be specified at 50. Further, a maximum number of active segments may be specified at 7, with a minimum active segment size specified at 50. For these specifications, the range selector 110 is shown as including three active segments (e.g., resulting in the three rows of plot panes shown), and the range selector 122 is shown as including two active segments (resulting in the two columns of plot panes shown).

For the example of FIG. 6, the data analyzer 102 may receive data 104 that is to be displayed. The range selector controller 106 may receive, based on an increase or a decrease in the size 108 of the range selector 110, a selection of a range 112 (e.g., the plot panes 33/11, 34/11, and 35/11) of plot panes from a plurality of available plot panes 114 (e.g., 100 rows, and 50 columns of plot panes) to display the data 104. The display generator 116 may generate, based on the received selection of the range 112 of plot panes, the display 118 (e.g., the user interface display 600) of the data 104 in plot panes included in the range 112 of plot panes.

Figure 7:
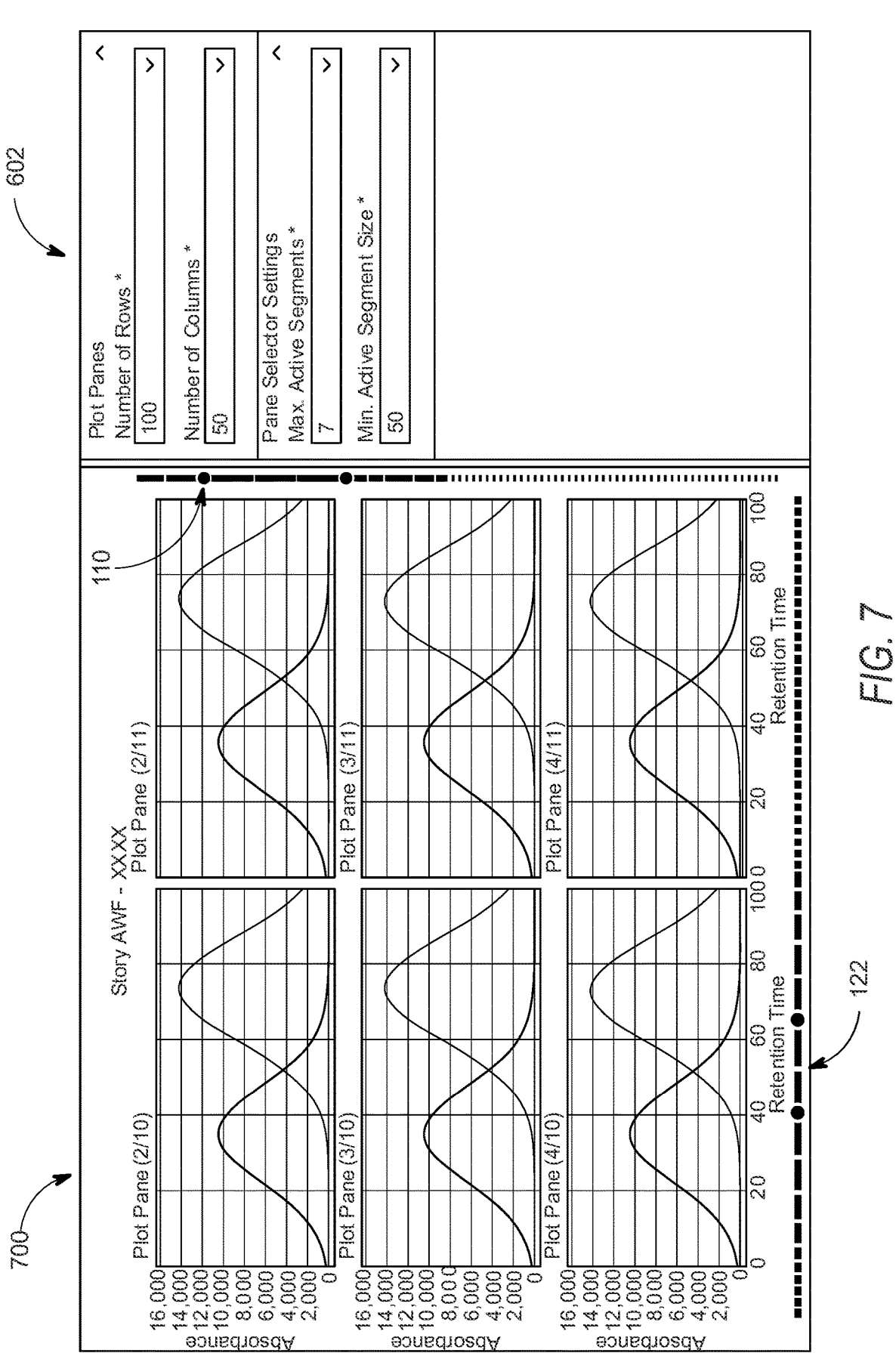

Referring to FIG. 7, compared to FIG. 6, for user interface display 700, the range selector 110 is shown as including three active segments (e.g., resulting in the three rows of plot panes shown), but scrolled upwards in the orientation of FIG. 7 to show a different set of plot panes. In this regard, the range selector 110 is utilized to display previously hidden plot panes.

Figure 8:
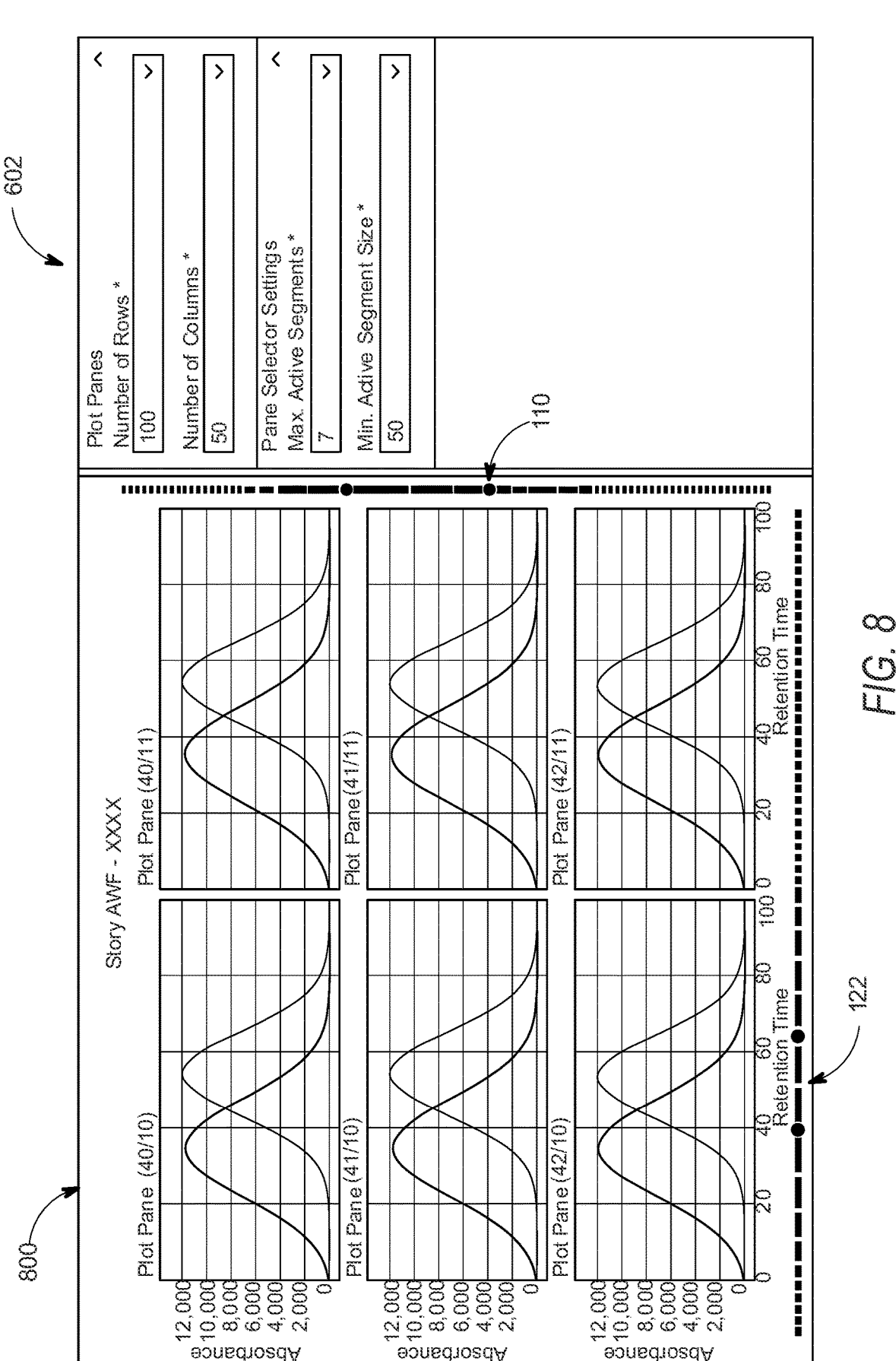

Referring to FIG. 8, compared to FIG. 7, for user interface display 800, the range selector 110 is shown as including three active segments (e.g., resulting in the three rows of plot panes shown), but scrolled downwards in the orientation of FIG. 8 to show a different set of plot panes.

Figure 9:
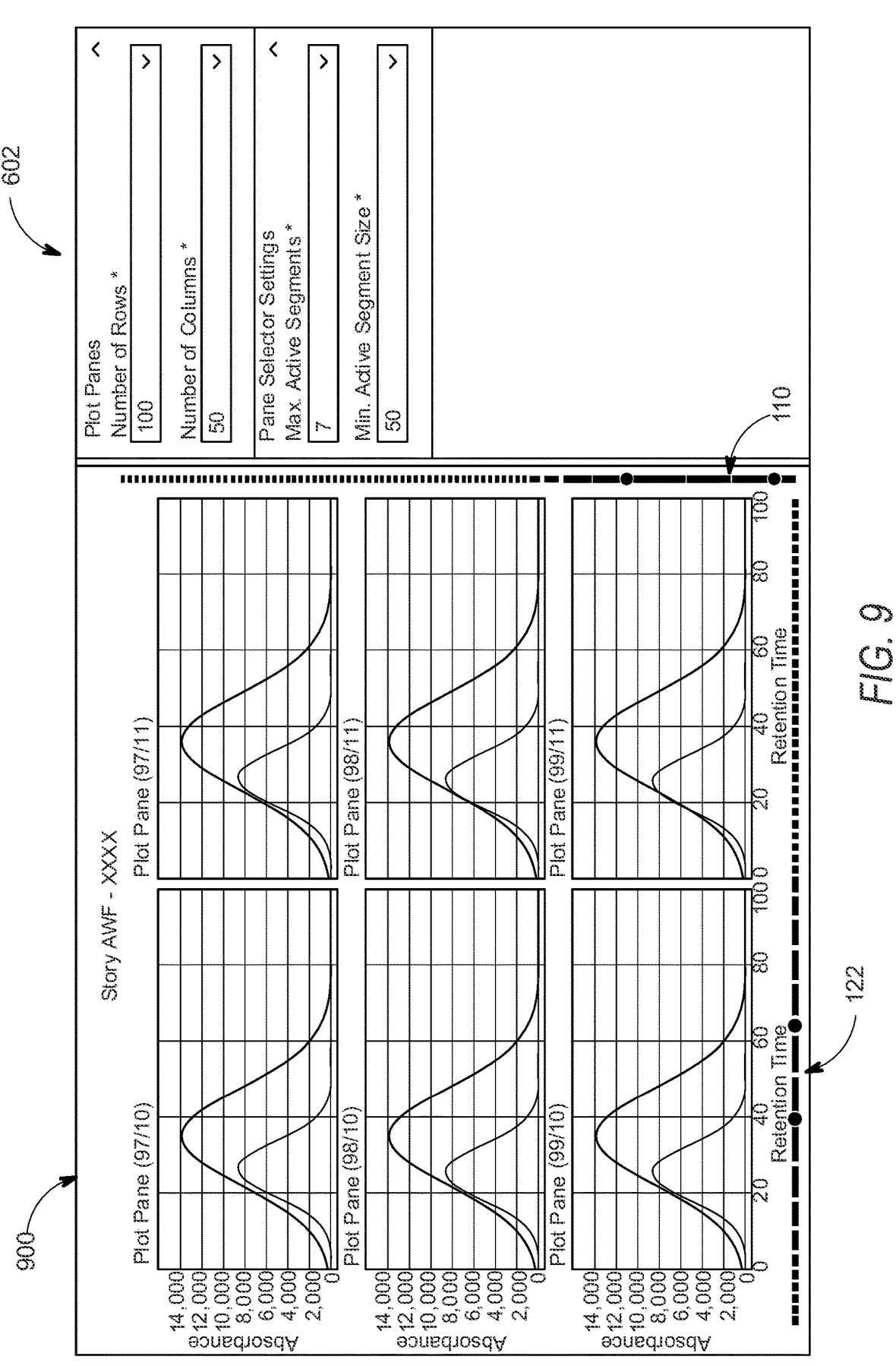

Referring to FIG. 9, compared to FIG. 8, for user interface display 900, the range selector 110 is shown as including three active segments (e.g., resulting in the three rows of plot panes shown), but scrolled further downwards in the orientation of FIG. 9 to show a different set of plot panes.

Figure 10:
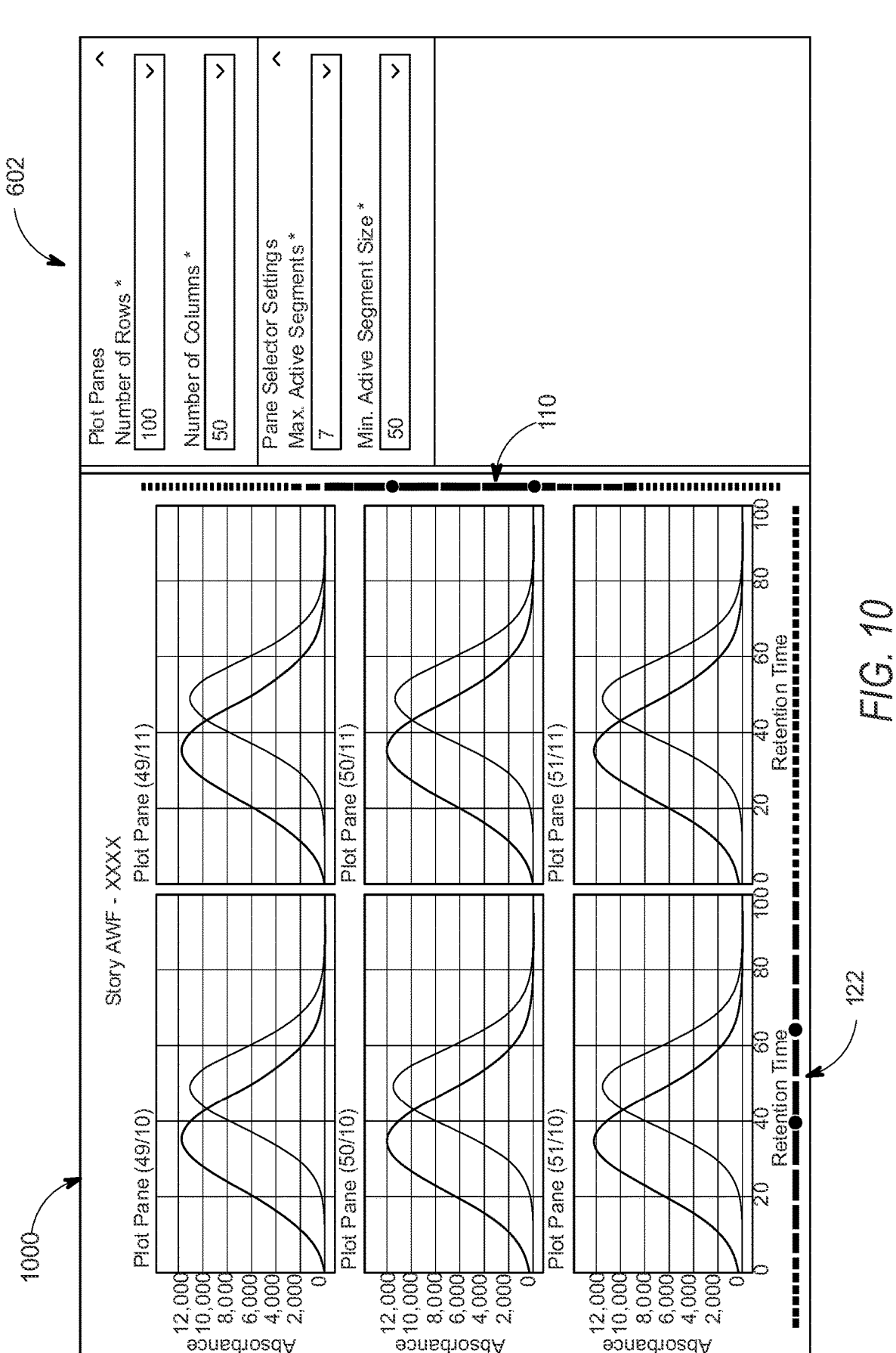

Referring to FIG. 10, compared to FIG. 9, for user interface display 1000, the range selector 110 is shown as including three active segments (e.g., resulting in the three rows of plot panes shown), but scrolled upwards in the orientation of FIG. 10 to show a different set of plot panes. Thus, with respect to FIGS. 6-10, the range selector 110 may be scrolled upwards and downwards in the orientation of FIGS. 6-10 to show different sets of plot panes.

Figure 11:
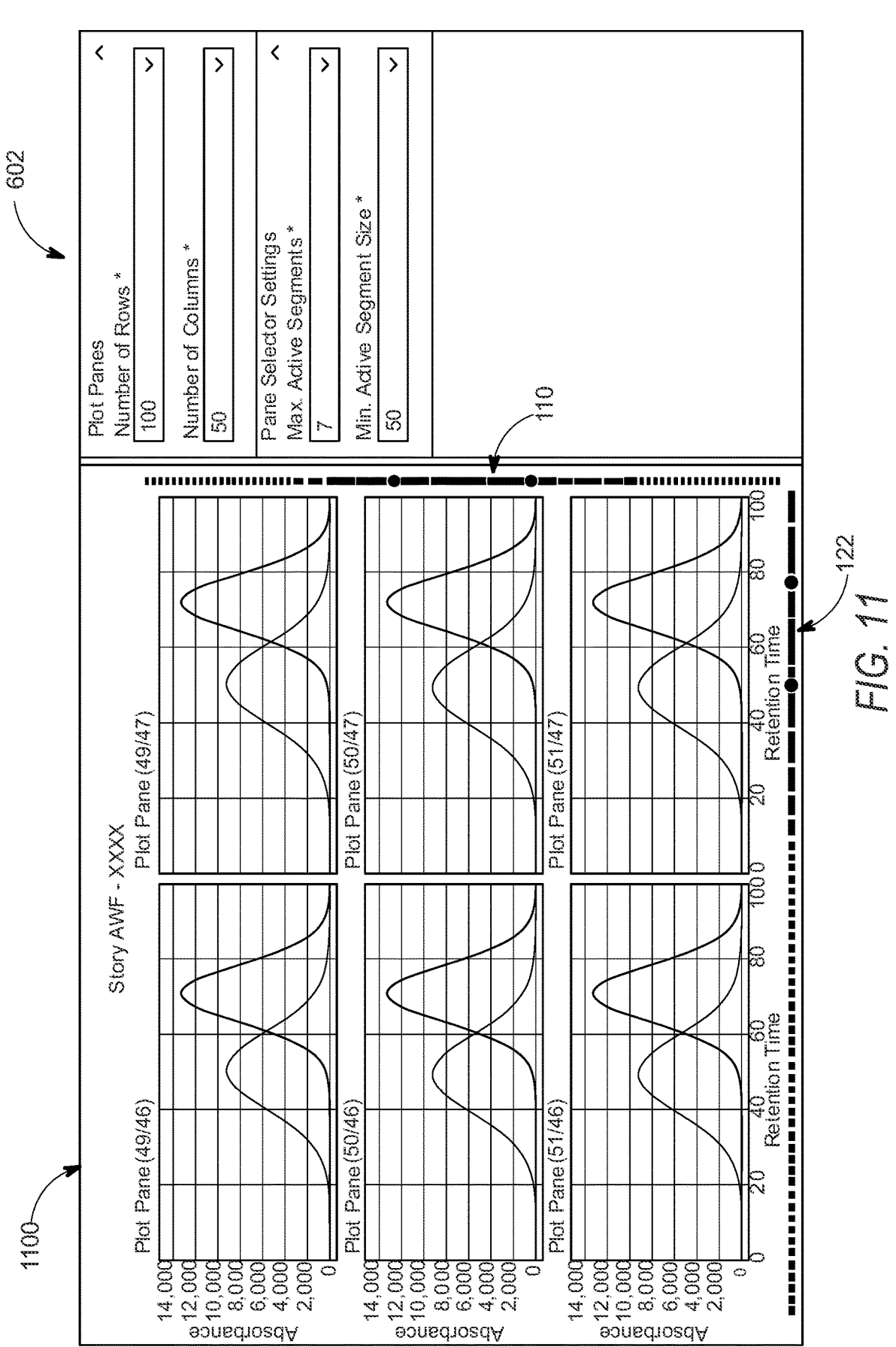

Referring to FIG. 11, compared to FIG. 10, for user interface display 1100, the range selector 110 remains at the location shown in FIG. 10. However, the range selector 122 is shown as including two active segments (e.g., resulting in the two columns of plot panes shown), but scrolled rightwards in the orientation of FIG. 11 to show a different set of plot panes.

Figure 12:
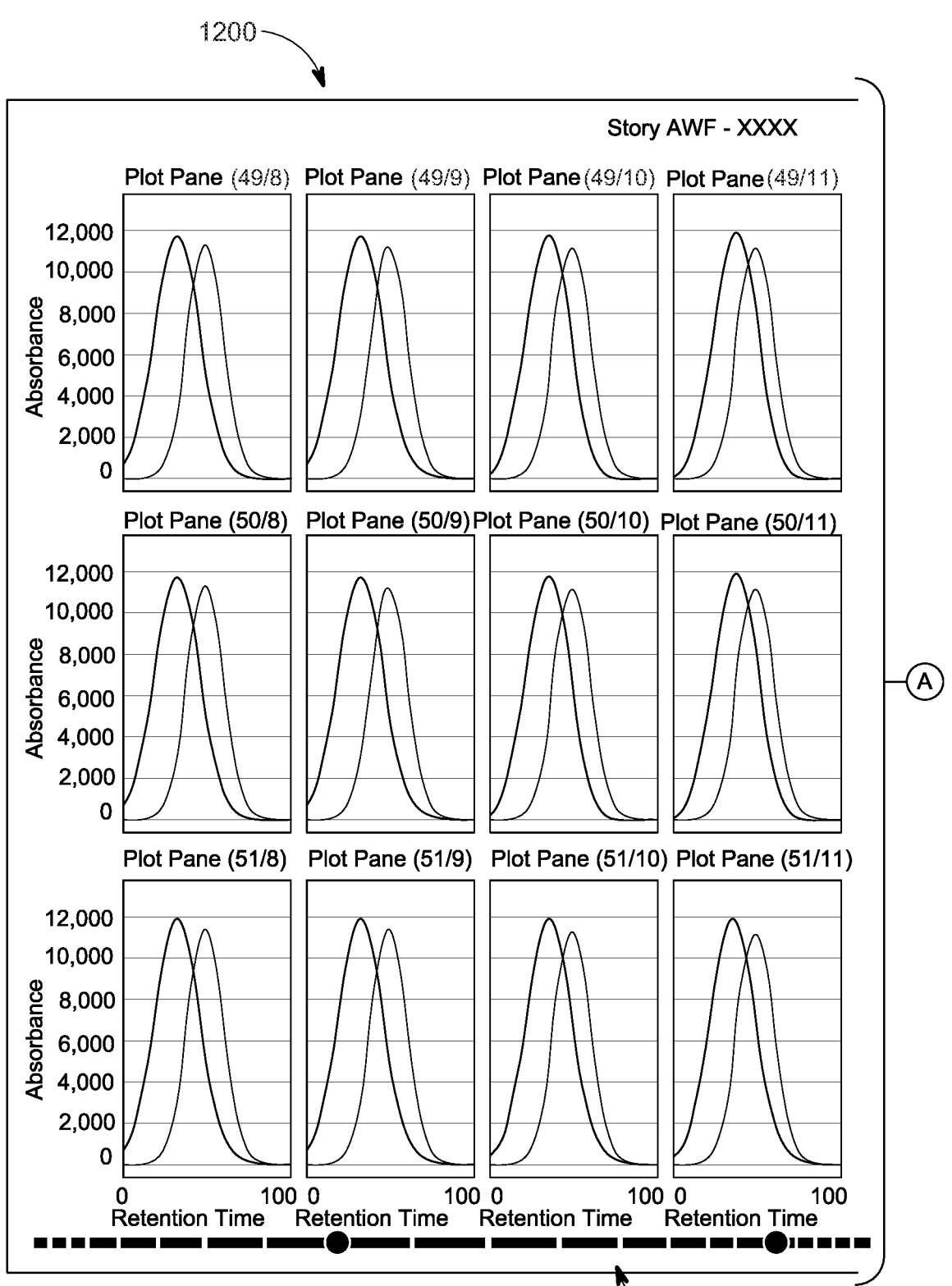
Figure 12:
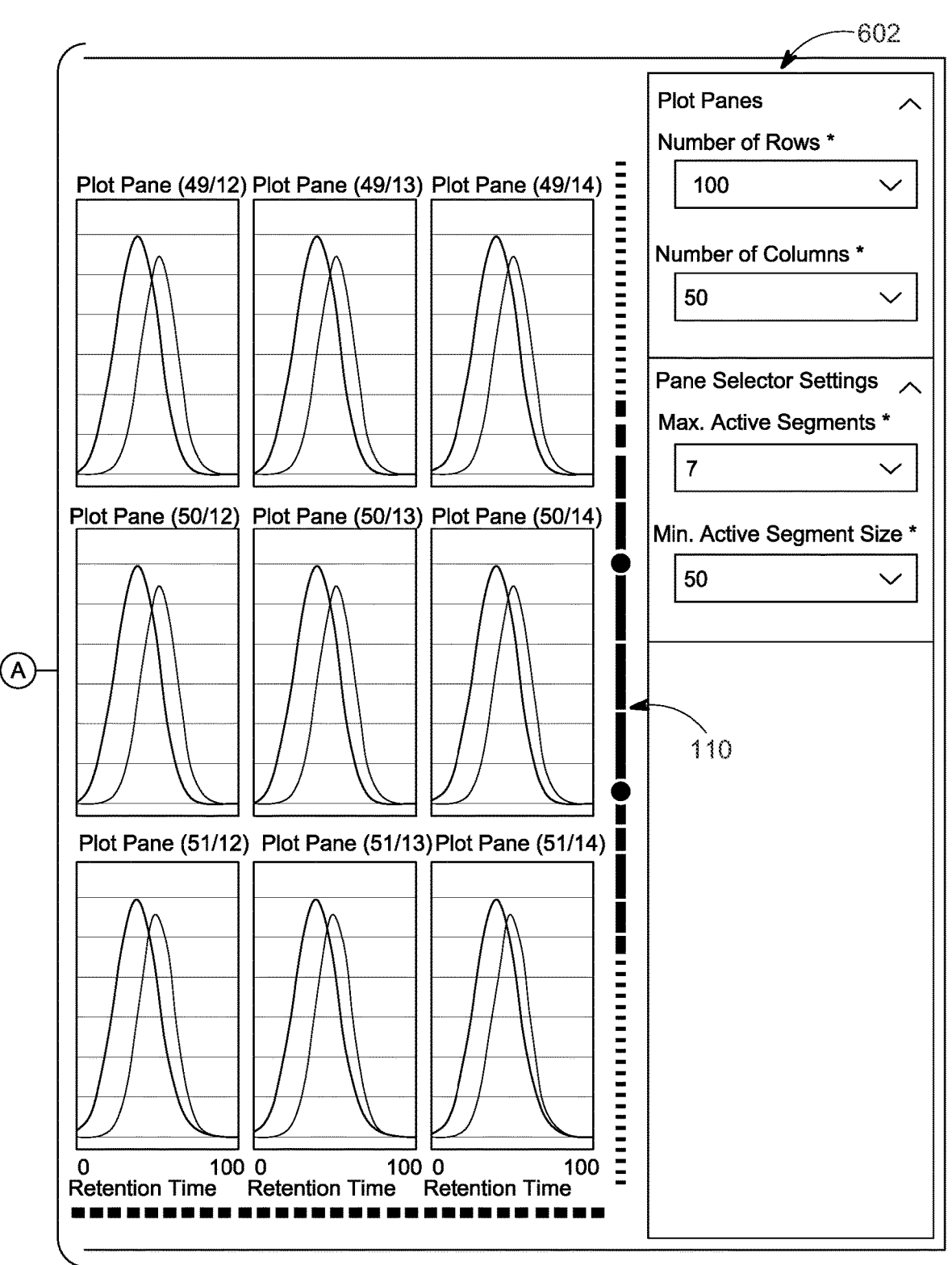

Referring to FIG. 12, compared to FIG. 11, for user interface display 1200, the range selector 110 remains as shown in FIG. 11. However, the size 120 of the range selector 122 is increased to include seven active segments (e.g., resulting in the seven columns of plot panes shown).

Figure 13:
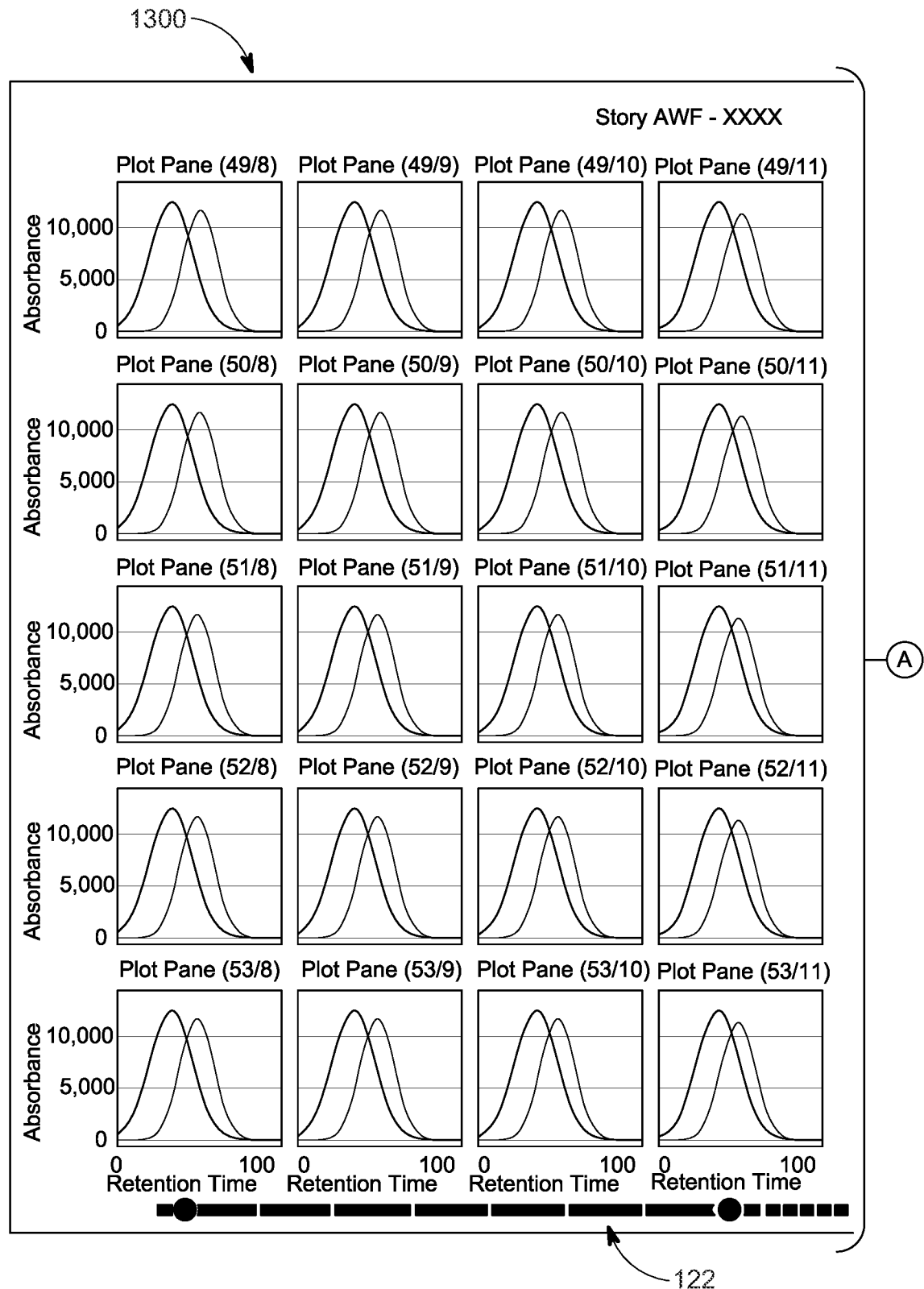
Figure 13:
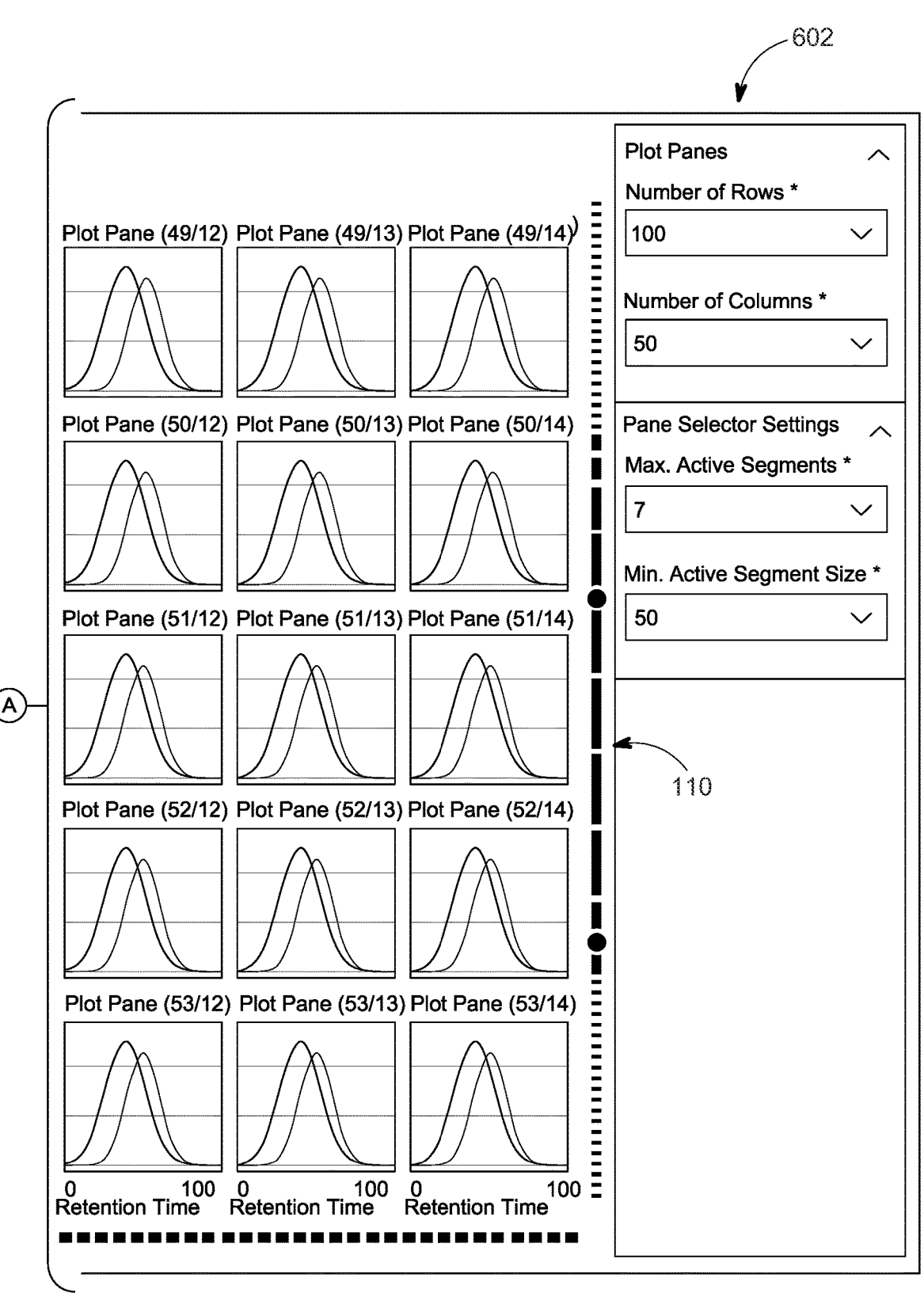

Referring to FIG. 13, compared to FIG. 12, for user interface display 1300, the size 108 of the range selector 110 is increased to include five active segments (e.g., resulting in the five rows of plot panes shown).

Figure 14:
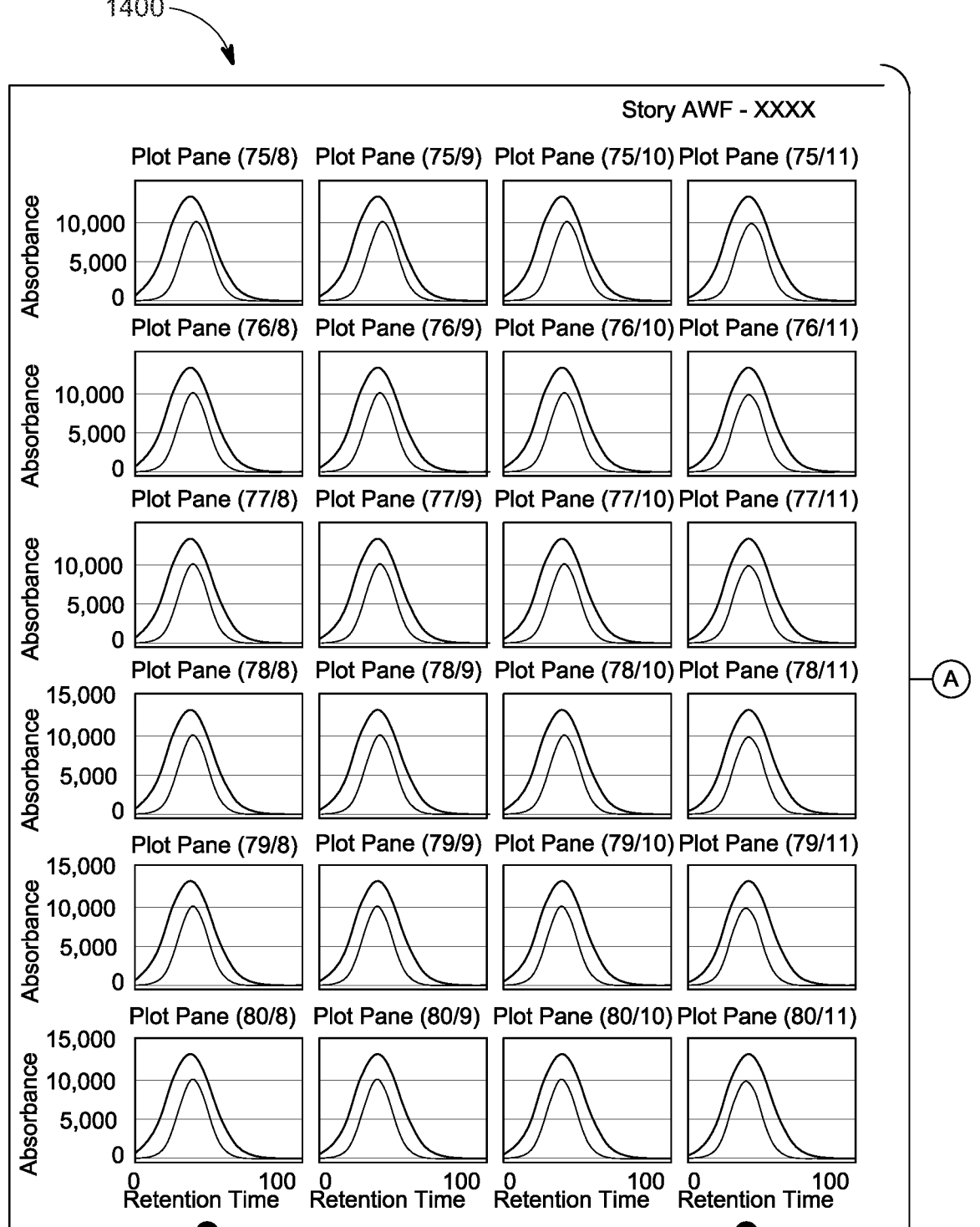
Figure 14:
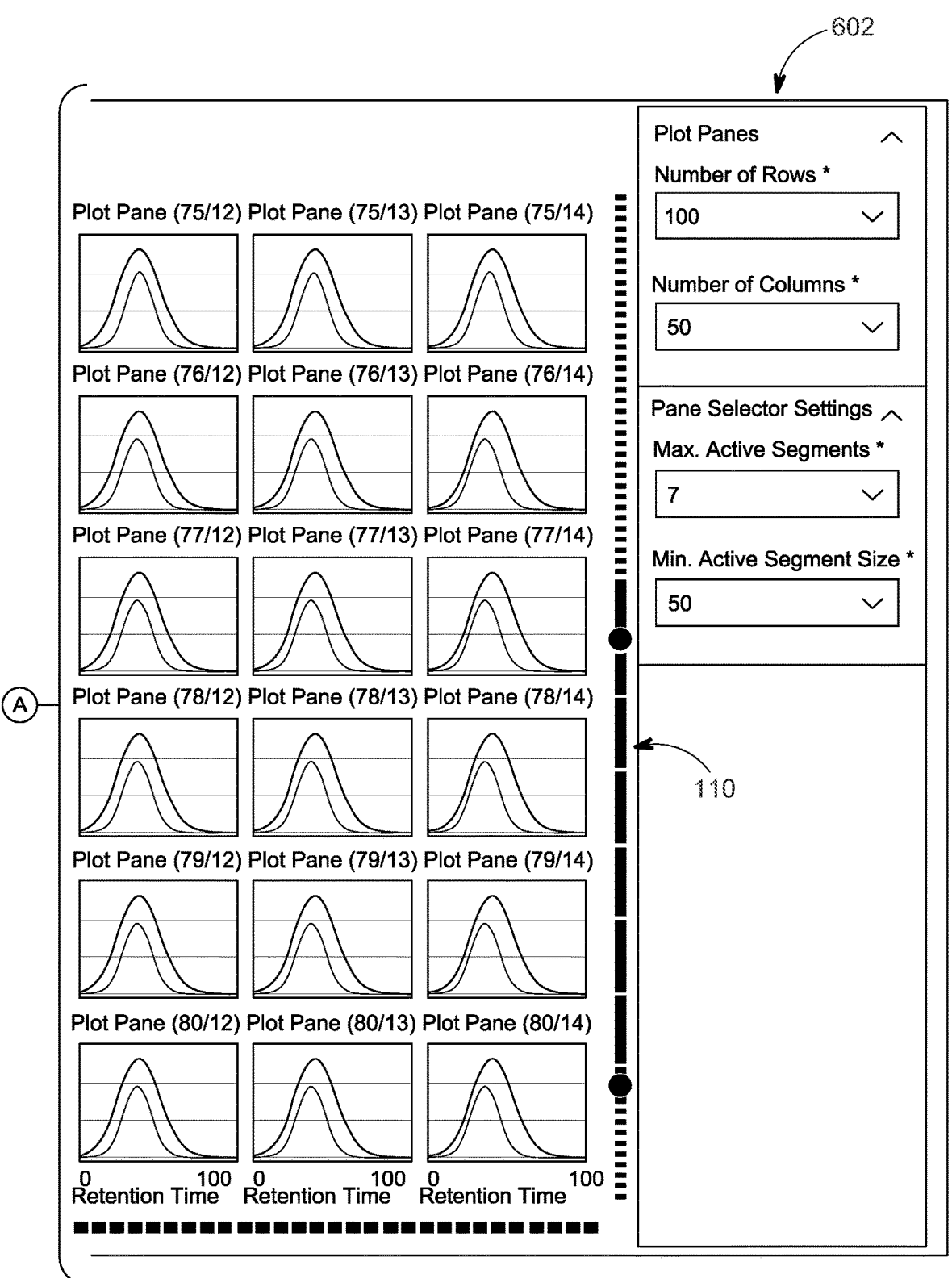

Referring to FIG. 14, compared to FIG. 13, for user interface display 1400, the size 108 of the range selector 110 is increased to include six active segments (e.g., resulting in the six rows of plot panes shown).

Figure 15:
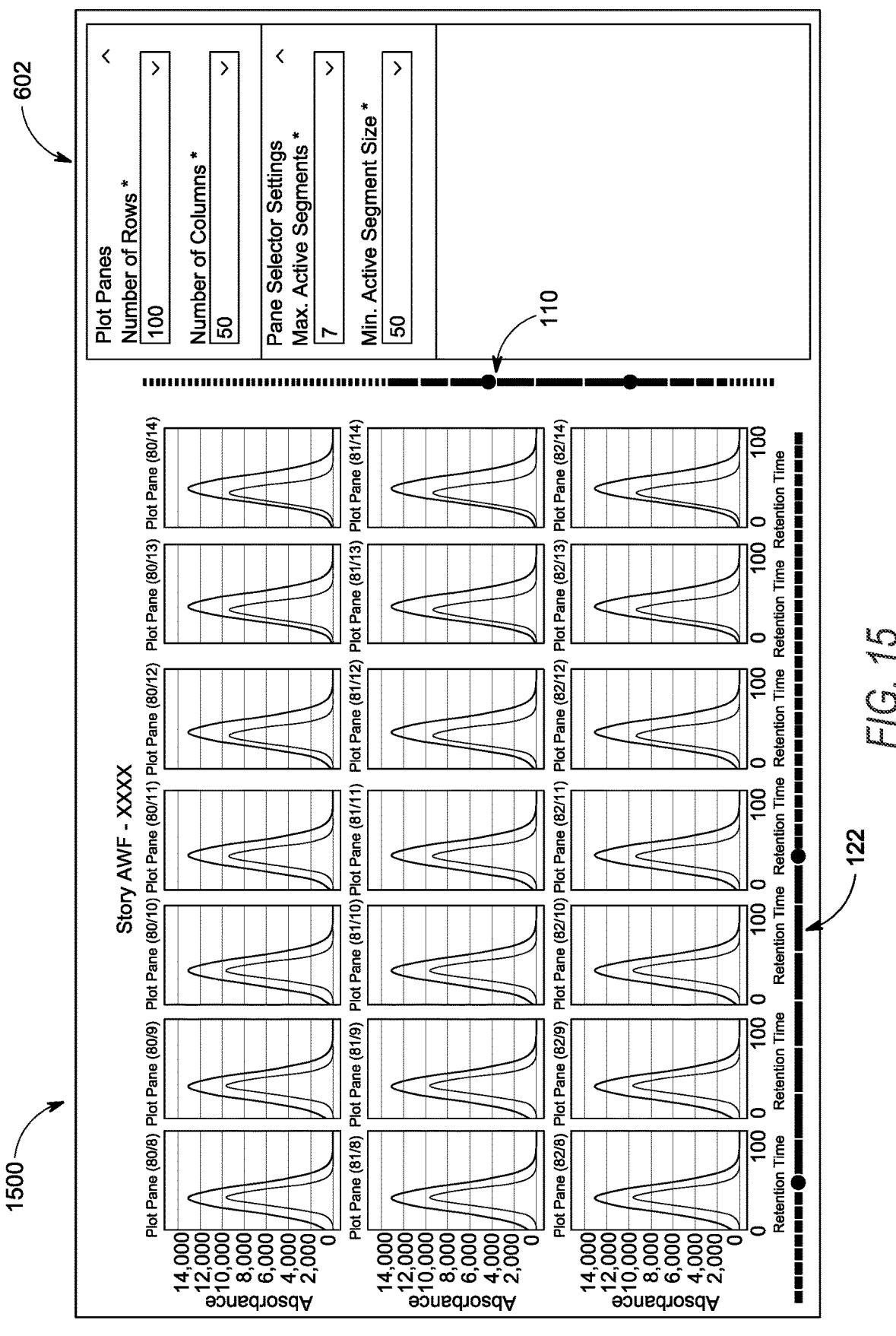

Referring to FIG. 15, compared to FIG. 14, for user interface display 1500, the size 108 of the range selector 110 is decreased to include three active segments (e.g., resulting in the three rows of plot panes shown).

Figure 16:
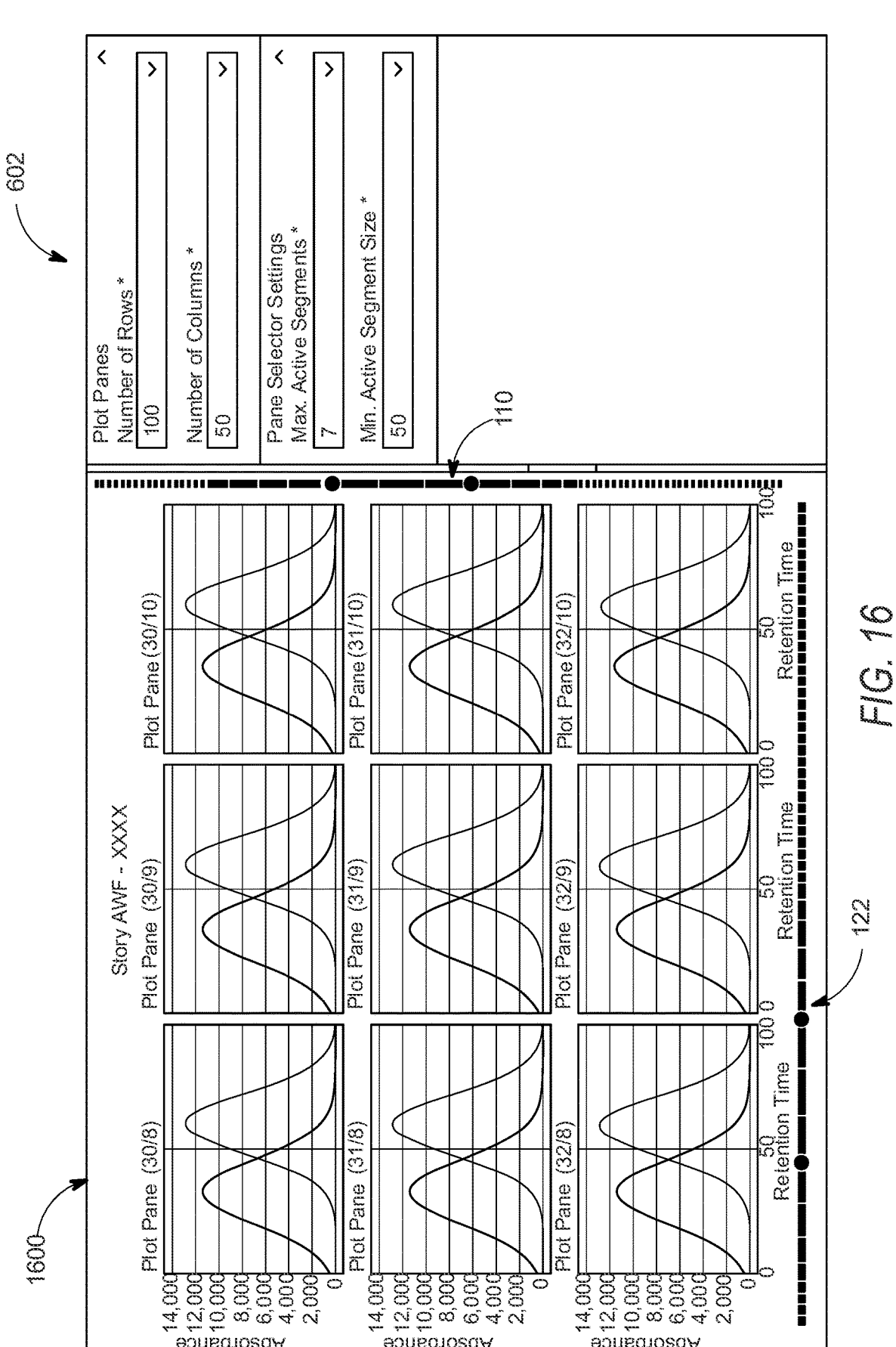

Referring to FIG. 16, compared to FIG. 15, for user interface display 1600, the size 120 of the range selector 122 is decreased to include three active segments (e.g., resulting in the three columns of plot panes shown).

Figure 17:
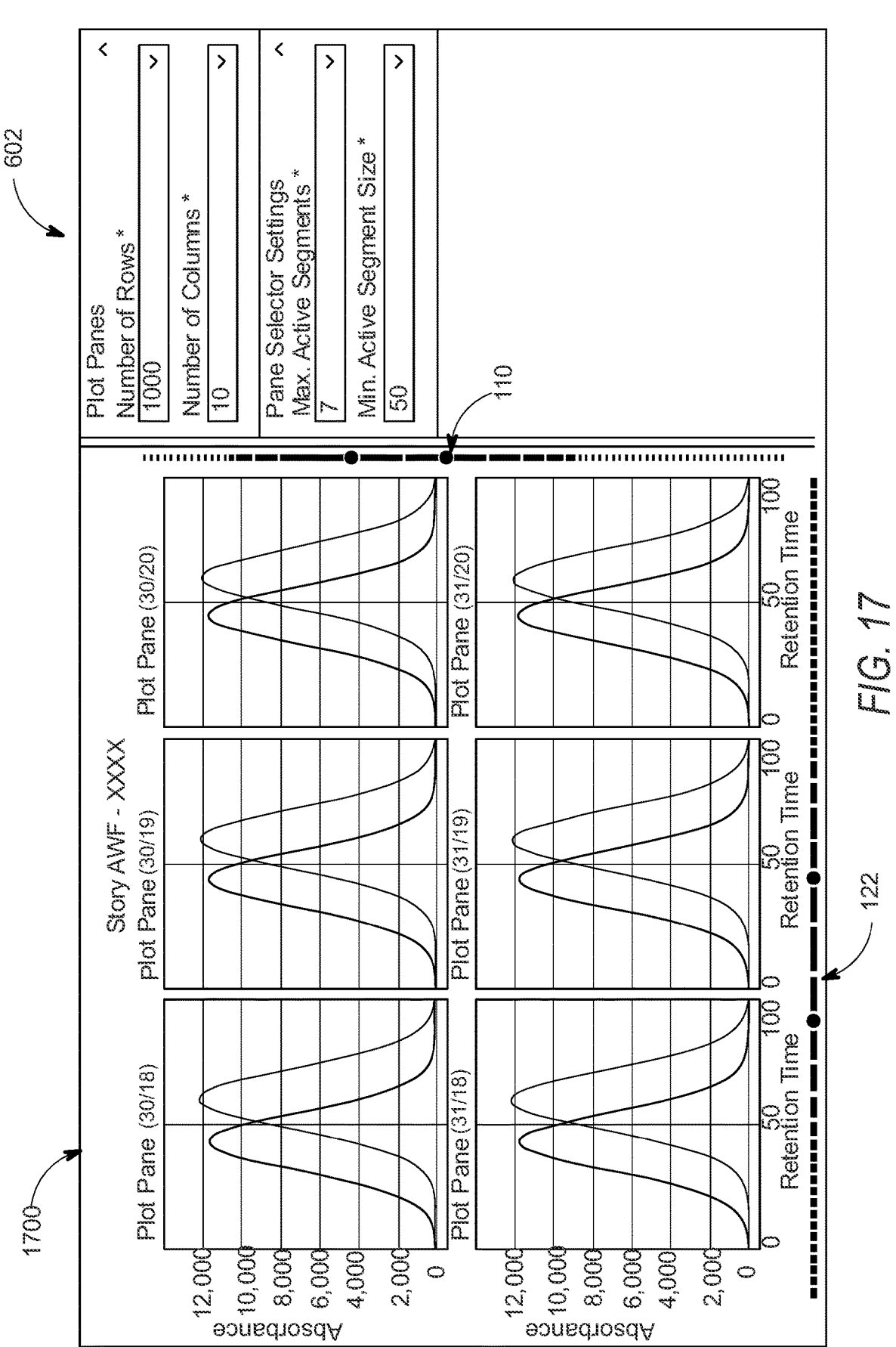

Referring to FIG. 17, compared to FIG. 16, for user interface display 1700, the size 108 of the range selector 110 is decreased to include two active segments (e.g., resulting in the two rows of plot panes shown). Further, the size 120 of the range selector 122 is decreased to include two active segments (e.g., resulting in the two columns of plot panes shown).

FIGS. 18-25 illustrate a user interface display to illustrate the non-linear operation of the range selectors 110 and 122 of the apparatus 100 for another set of specifications associated with the range selectors 110 and 122, in accordance with an example of the present disclosure.

Figure 18:
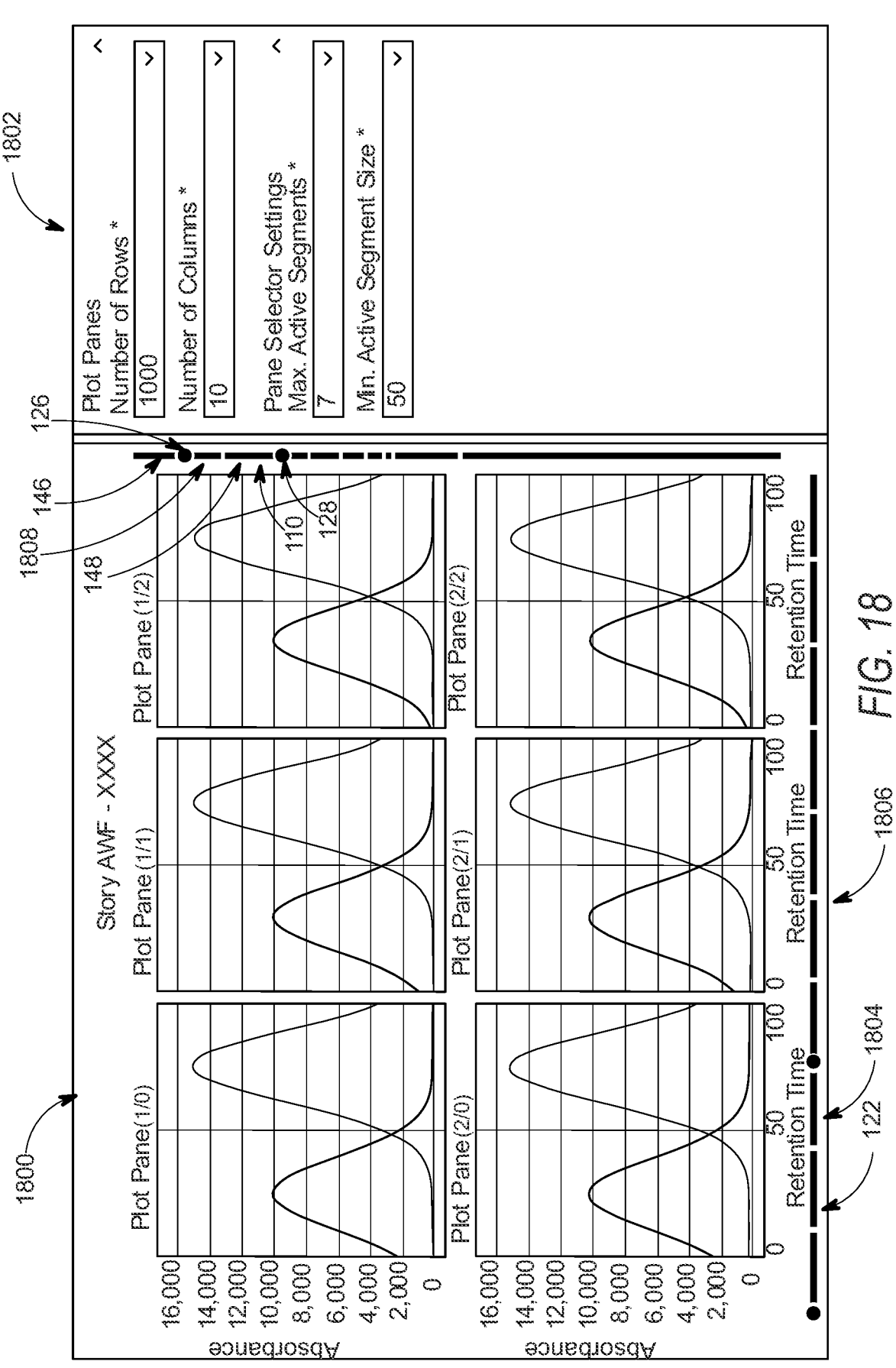
FIGS. 18-25 illustrate another user interface display to illustrate a non-linear operation of the range selectors of the linear and non-linear range-based plot pane selection apparatus of FIG. 1, for another set of specifications associated with the range selectors, in accordance with an example of the present disclosure.

Referring to FIG. 18, the user interface display 1800 (e.g., of the display 118) shows an example of the non-linear operation of the range selectors 110 and 122. As shown at 1802, a maximum number of rows of plot panes may be specified at 1000, and a maximum number of columns of plot panes may be specified at 10. Further, a maximum number of active segments may be specified at 7, with a minimum active segment size specified at 50. For these specifications, the range selector 110 is shown as including two active segments (e.g., resulting in the two rows of plot panes shown), and the range selector 122 is shown as including three active segments (resulting in the three columns of plot panes shown).

With respect to the non-linear operation of the range selector 110, as disclosed herein, the size 108 of the range selector 110 may be non-linearly proportional to the available plot panes 114 to display the data 104. Similarly, the size 120 of the range selector 122 may be non-linearly proportional to the available plot panes 114 to display the data 104 with respect to the column of plot panes.

With respect to the non-linear operation of the range selectors 110 and 122, as disclosed herein, the range selector controller 106 may determine (e.g., for the range selector 122) whether a maximum number of specified plot panes 134 (e.g., 10 (the number of columns) for range selector 122 for the example of FIG. 18) is less than or equal to a specified threshold 136 (e.g., 10 for the example display of FIG. 18). Based on a determination that the maximum number of specified plot panes 138 (e.g., 10) is less than or equal to the specified threshold 140 (e.g., 10), the range selector controller 106 may specify the size 120 of the range selector 122 as linearly proportional to the available plot panes 114 (e.g., 1000×10=10000 plot panes) to display the data 104. For example, as shown at 1804, the range selector 122 includes a selection of three segments (e.g., three columns of plot panes), from the ten total segments shown at 1806.

Similarly, the range selector controller 106 may determine (e.g., for the range selector 110) whether the maximum number of specified plot panes 134 (e.g., 1000 (the number of rows) for range selector 110 for the example of FIG. 18) is greater than the specified threshold 136 (e.g., 10 for the example display of FIG. 18). Based on a determination that the maximum number of specified plot panes 134 (e.g., 1000) is greater than the specified threshold 136 (e.g., 10), the range selector controller 106 may specify the size 108 of the range selector 110 as non-linearly proportional to the available plot panes 114 to display the data 104. For example, as shown at 1808, the range selector controller 106 may specify the size 108 (e.g., minimum one segment of a specified display dimension, irrespective of the 1000 specified rows) of the range selector 110 as non-linearly proportional to the available plot panes 114 to display the data 104. In this regard, in order to specify the non-linear proportionality of the size 108 of the range selector 110, the segment controller 142 may determine the minimum size 144 (e.g., one active segment of a specified dimension) for active segments associated with plot panes. The segment controller 142 may determine a transition area 146 in a vicinity of active segments 148 associated with the range 112 (e.g., two active segments) of plot panes. The segment controller 142 may modify, based on a comparison of a size of the active segments 148 associated with the range 112 of plot panes and a size of inactive segments to the minimum size 144 for active segments associated with the plot panes, the transition area 146.

Figure 19:
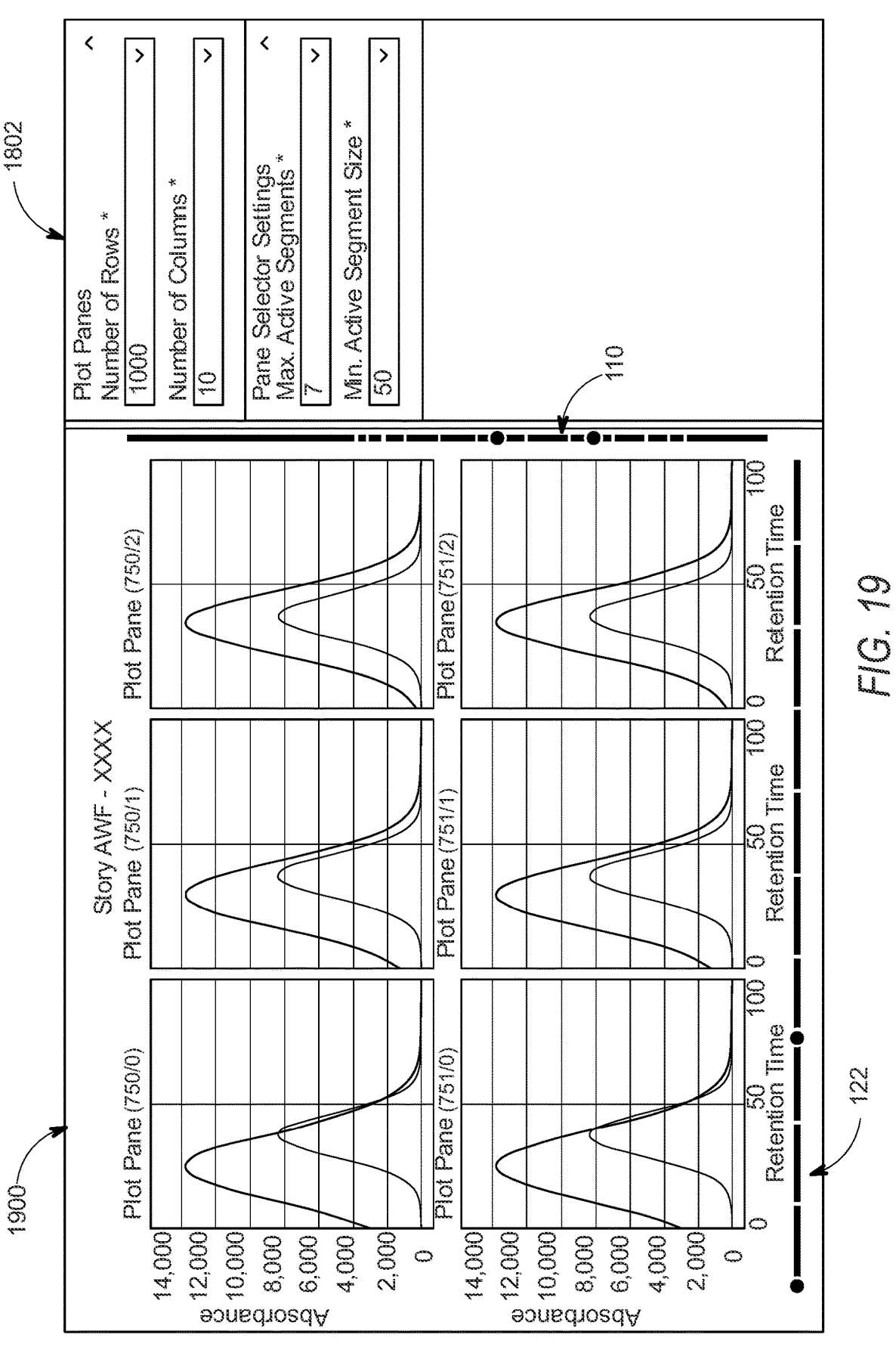

Referring to FIG. 19, compared to FIG. 18, for user interface display 1900, the range selector 110 is shown as including two active segments (e.g., resulting in the two rows of plot panes shown), but scrolled downwards in the orientation of FIG. 19 to show a different set of plot panes.

Figure 20:
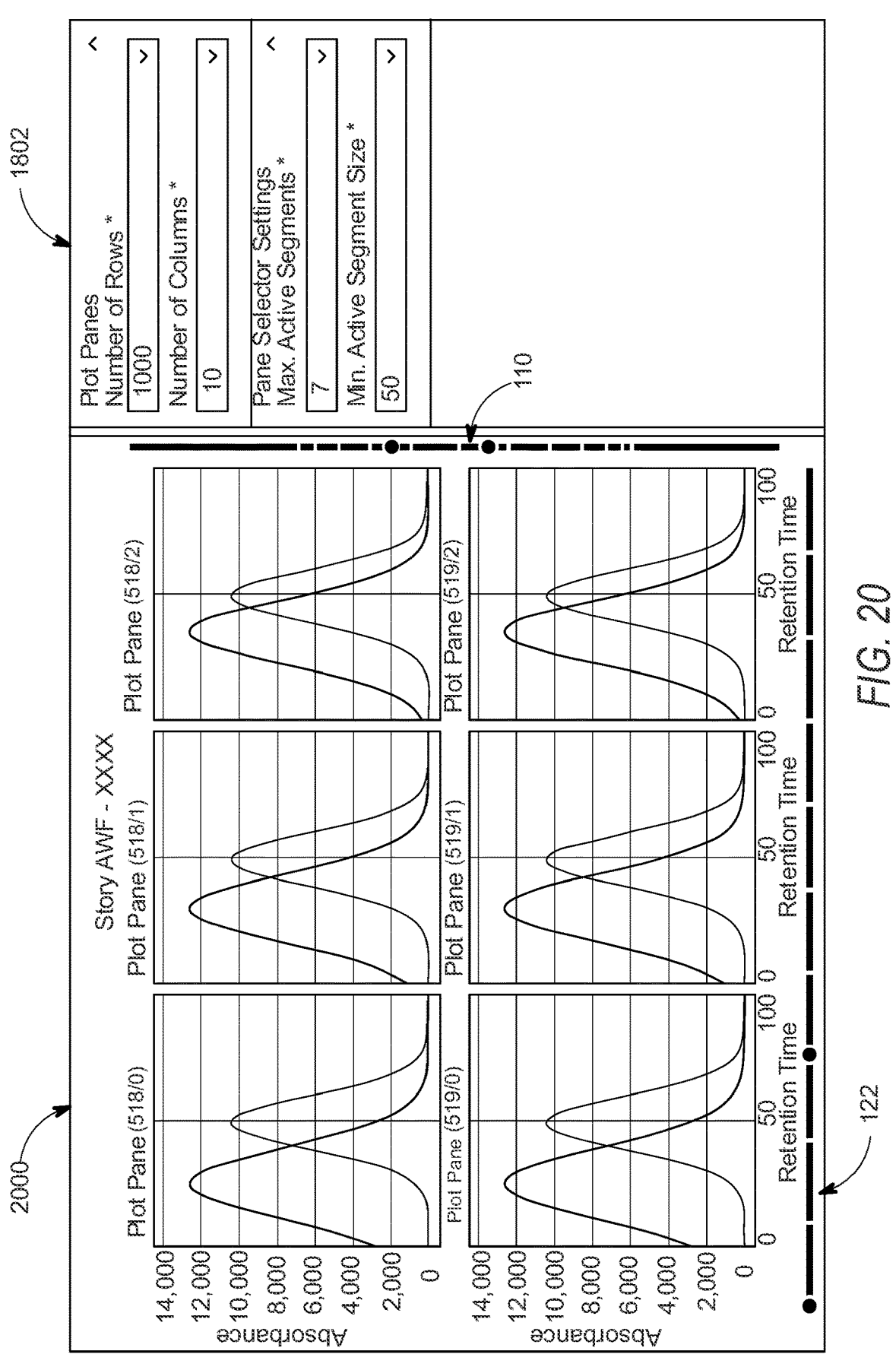

Referring to FIG. 20, compared to FIG. 19, for user interface display 2000, the range selector 110 is shown as including two active segments (e.g., resulting in the two rows of plot panes shown), but scrolled upwards in the orientation of FIG. 20 to show a different set of plot panes.

Figure 21:
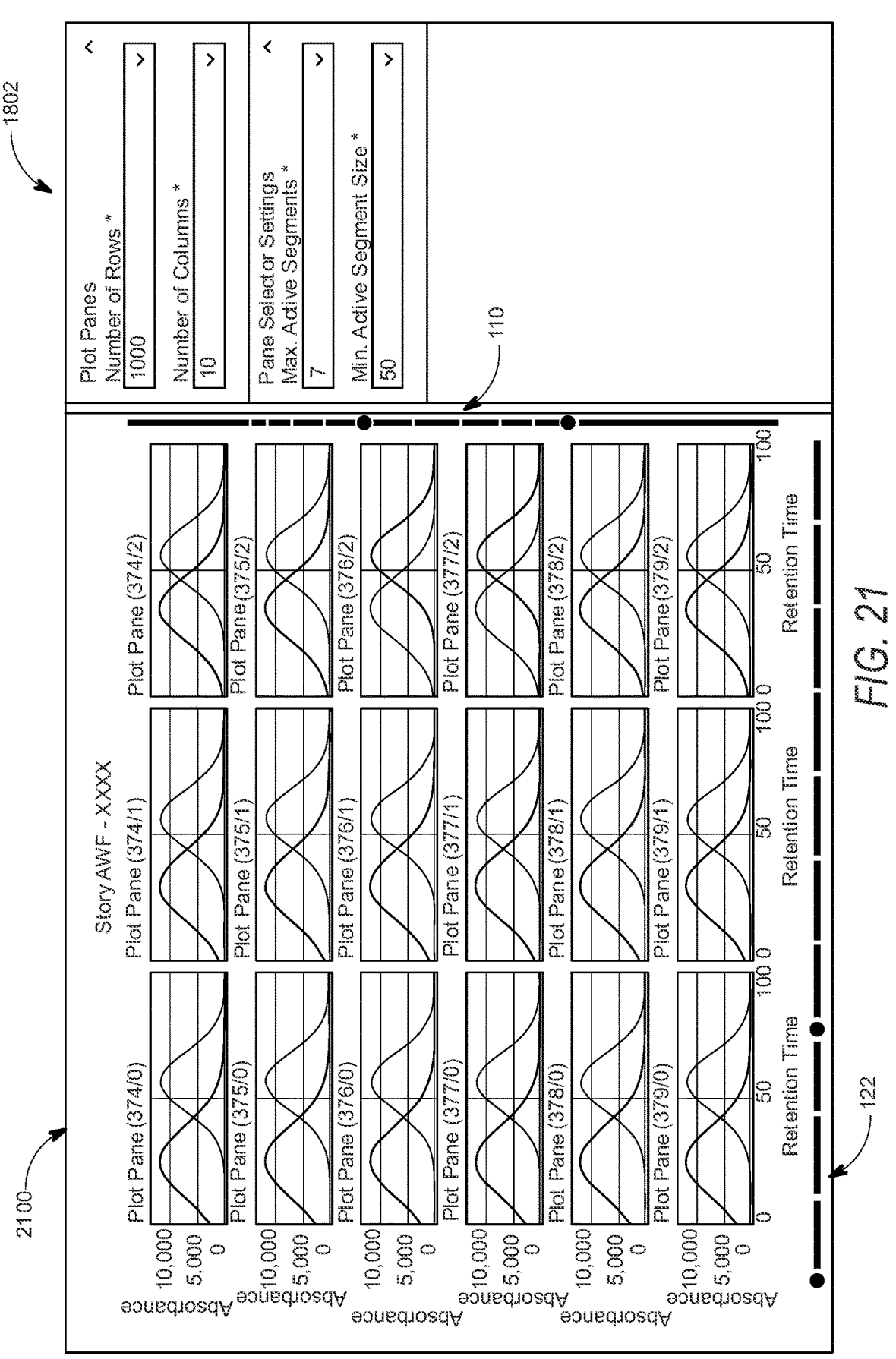

Referring to FIG. 21, compared to FIG. 20, for user interface display 2100, the range selector 110 is shown as including six active segments (e.g., resulting in the six rows of plot panes shown).

Figure 22:
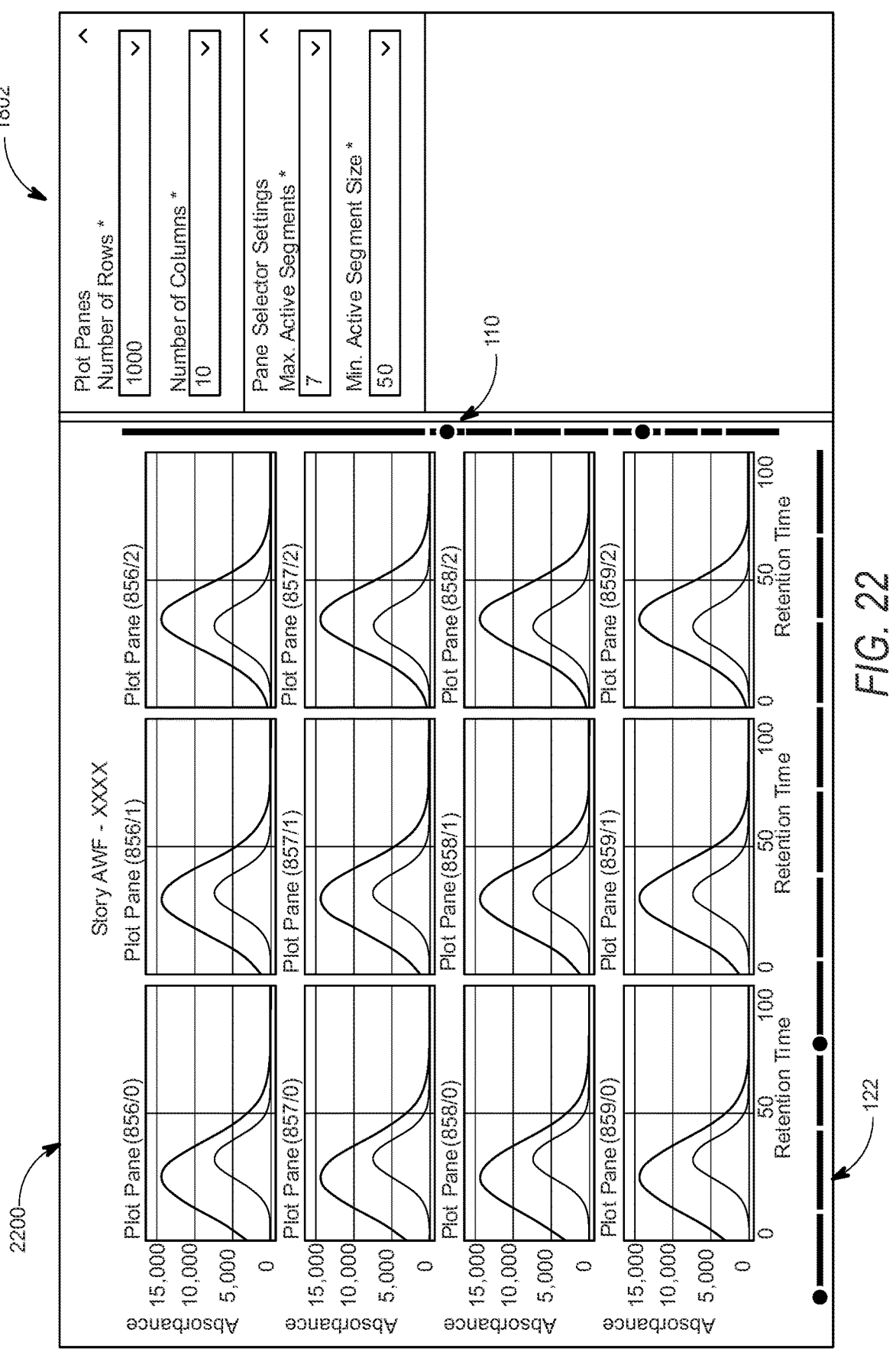

Referring to FIG. 22, compared to FIG. 21, for user interface display 2200, the range selector 110 is shown as including four active segments (e.g., resulting in the four rows of plot panes shown), and scrolled downwards in the orientation of FIG. 22 to show a different set of plot panes.

Figure 23:
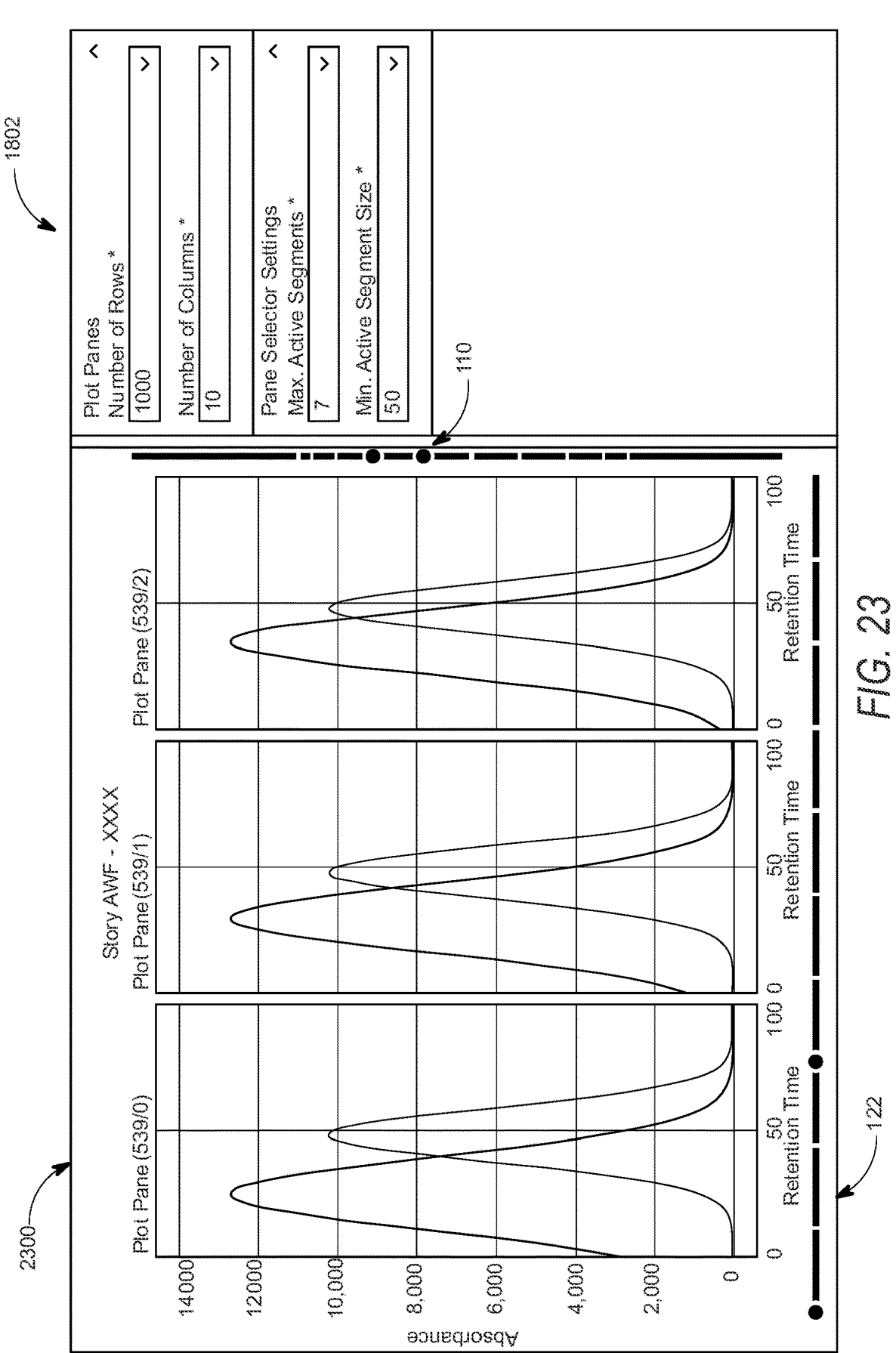

Referring to FIG. 23, compared to FIG. 22, for user interface display 2300, the range selector 110 is shown as including one active segment (e.g., resulting in the single row of plot panes shown), and scrolled upwards in the orientation of FIG. 23 to show a different set of plot panes.

Figure 24:
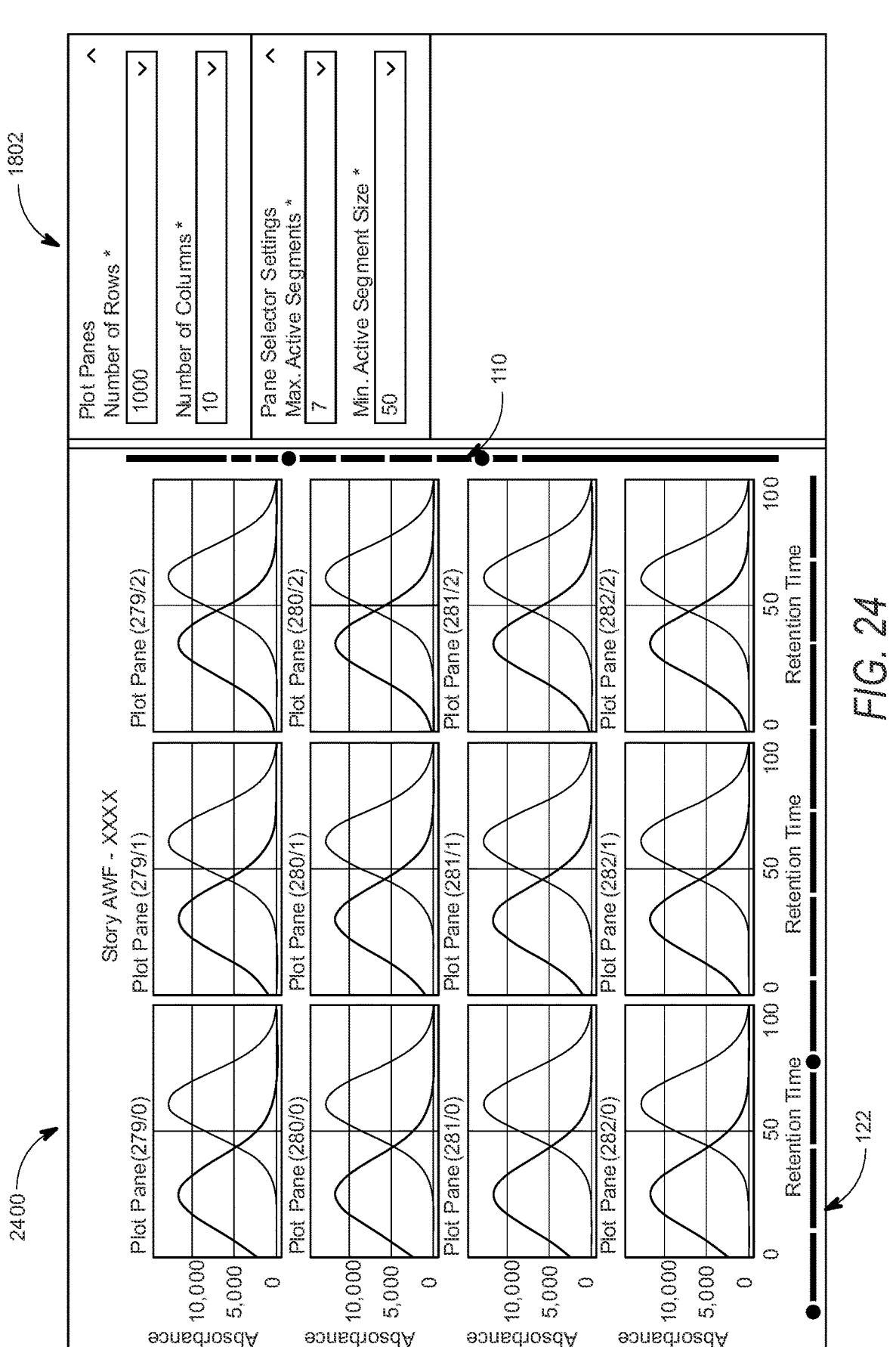

Referring to FIG. 24, compared to FIG. 23, for user interface display 2400, the range selector 110 is shown as including four active segments (e.g., resulting in the four rows of plot panes shown), and scrolled upwards in the orientation of FIG. 24 to show a different set of plot panes.

Figure 25:
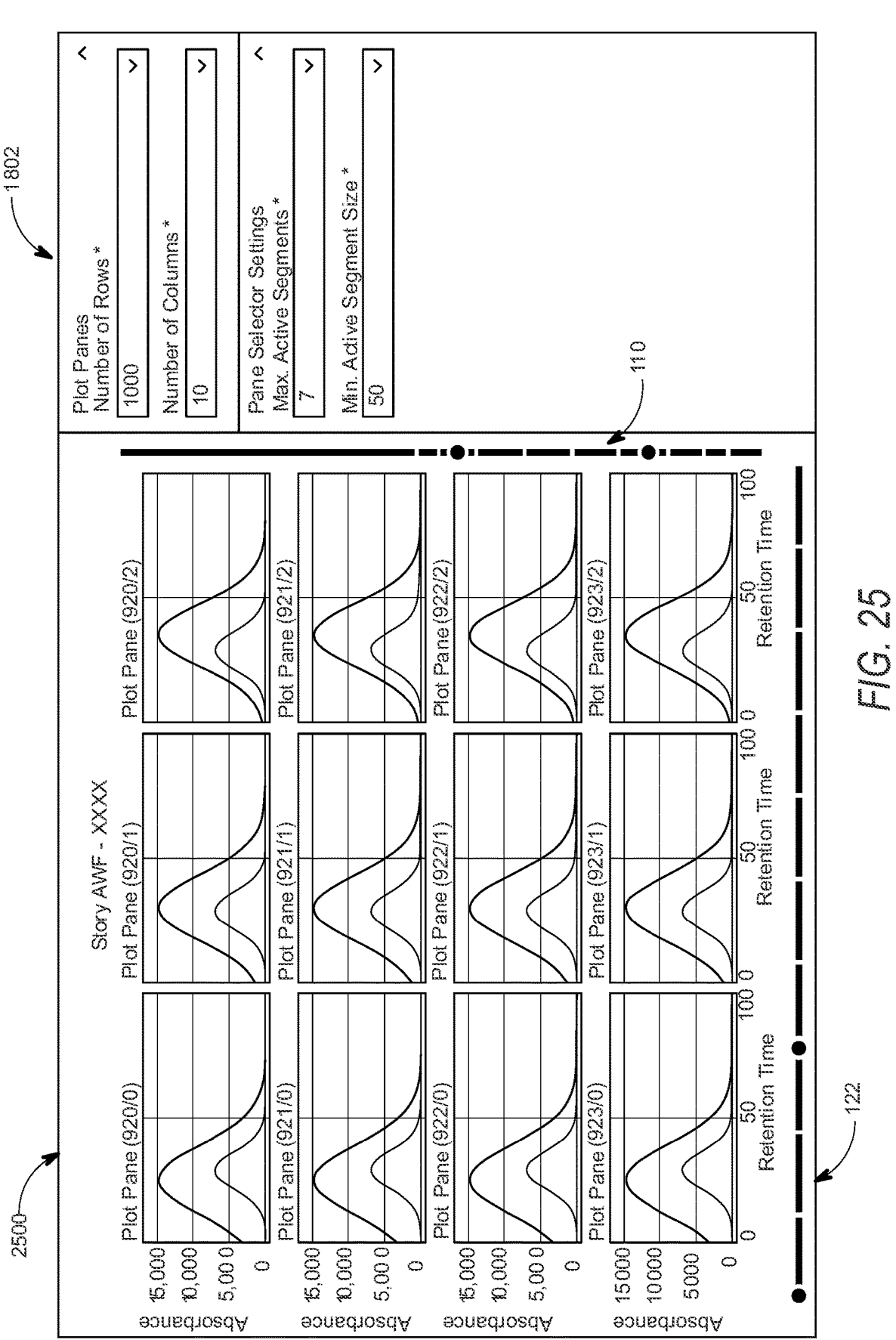

Referring to FIG. 25, compared to FIG. 24, for user interface display 2500, the range selector 110 is shown as including four active segments (e.g., resulting in the four rows of plot panes shown), and scrolled downwards in the orientation of FIG. 25 to show a different set of plot panes.

With reference to FIGS. 18-25, irrespective of the number of active segments, based on the non-linearity of the segment sizes, the range selector 110 and the associated interactive elements 126 and 128 remain fully functional. For example, the interactive elements 126 and 128 may be utilized to receive a touch device based input, or a user contact based input to operate the range selector 110, irrespective of whether the range selector 110 is in the configuration of FIG. 18 or whether the range selector 110 is in the configuration of FIG. 23.

Figure 26:
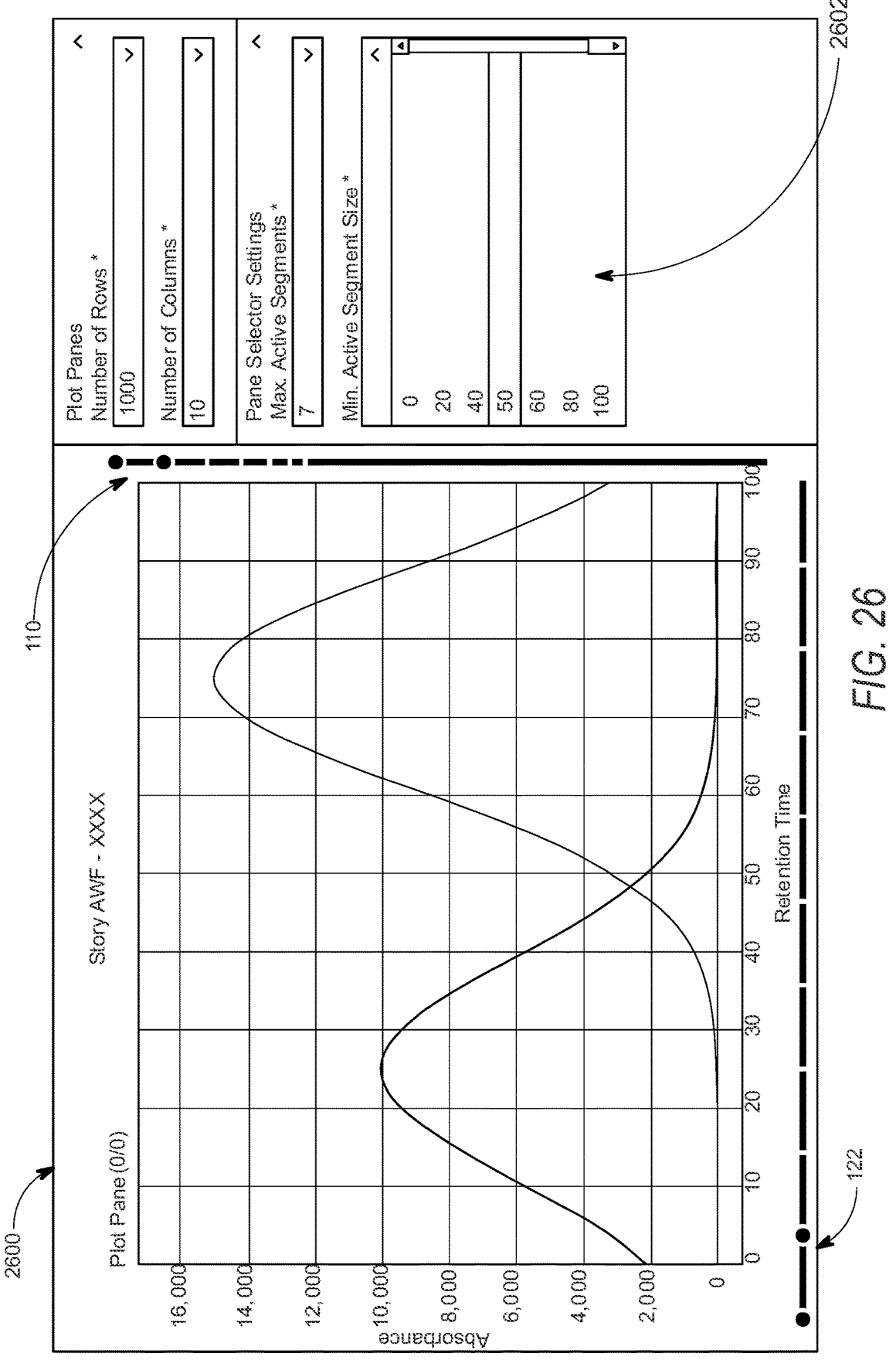
FIG. 26 illustrates another user interface display to illustrate size selection for active segments, in accordance with an example of the present disclosure.

FIG. 26 illustrates a user interface display 2600 to illustrate size selection for the active segments, in accordance with an example of the present disclosure.

Referring to FIG. 26, the user interface display 2600 (e.g., of the display 118) shows, at 2602, various size options for the active segments ranging from 0 (smallest) to 100 (largest). In this case, the size of zero does not impose any size restrictions to the active segments, resulting in usage of the non-linear size distribution of the segments. FIGS. 27-31 illustrate a user interface display to illustrate details of a linear operation of the range selectors 110 and 122 of the apparatus 100 for another set of specifications associated with the range selectors 110 and 122, in accordance with an example of the present disclosure.

Figure 27:
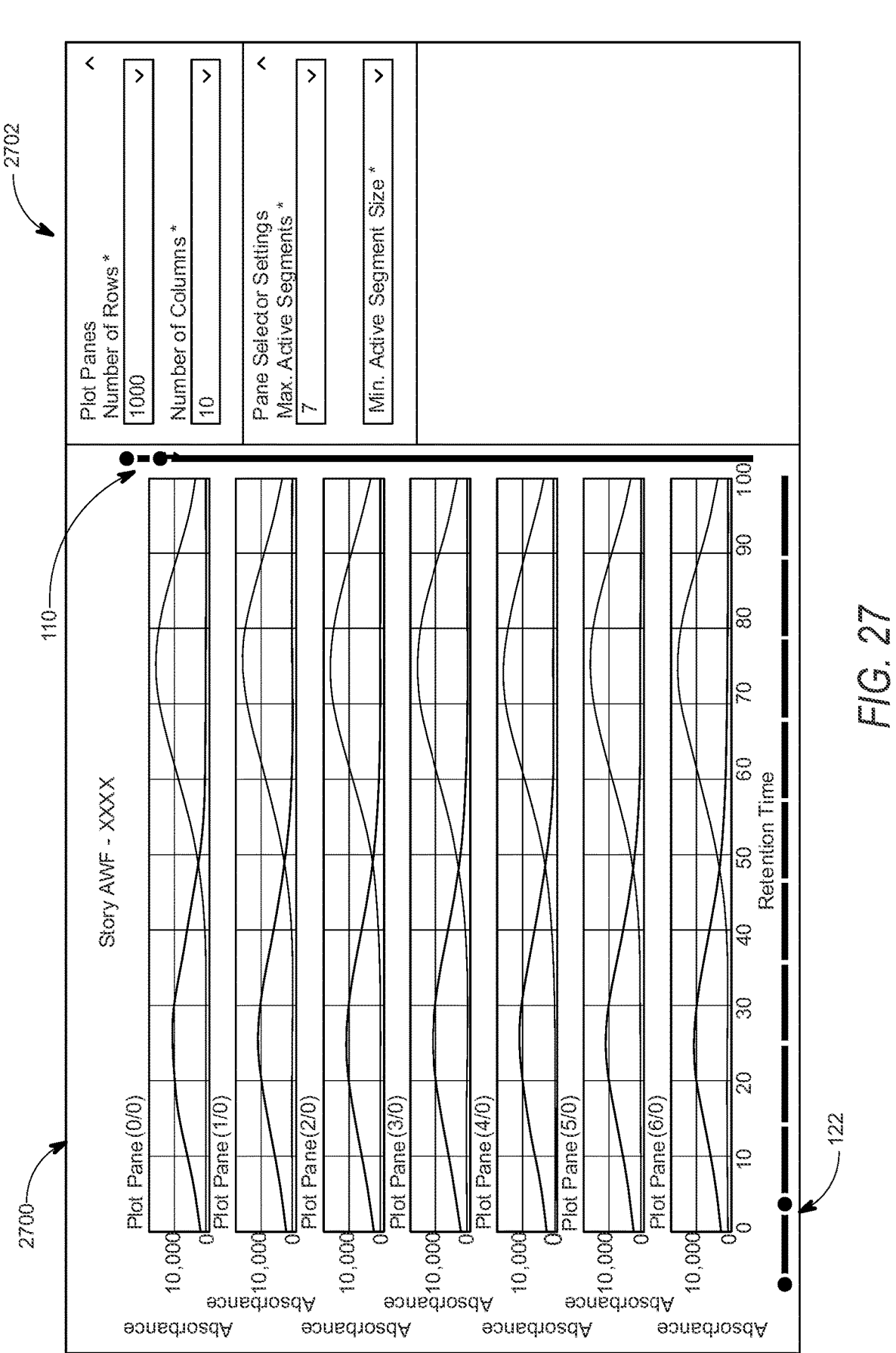
FIGS. 27-31 illustrate another user interface display to illustrate details of a linear operation of the range selectors of the linear and non-linear range-based plot pane selection apparatus of FIG. 1, for another set of specifications associated with the range selectors, in accordance with an example of the present disclosure.
Figure 28:
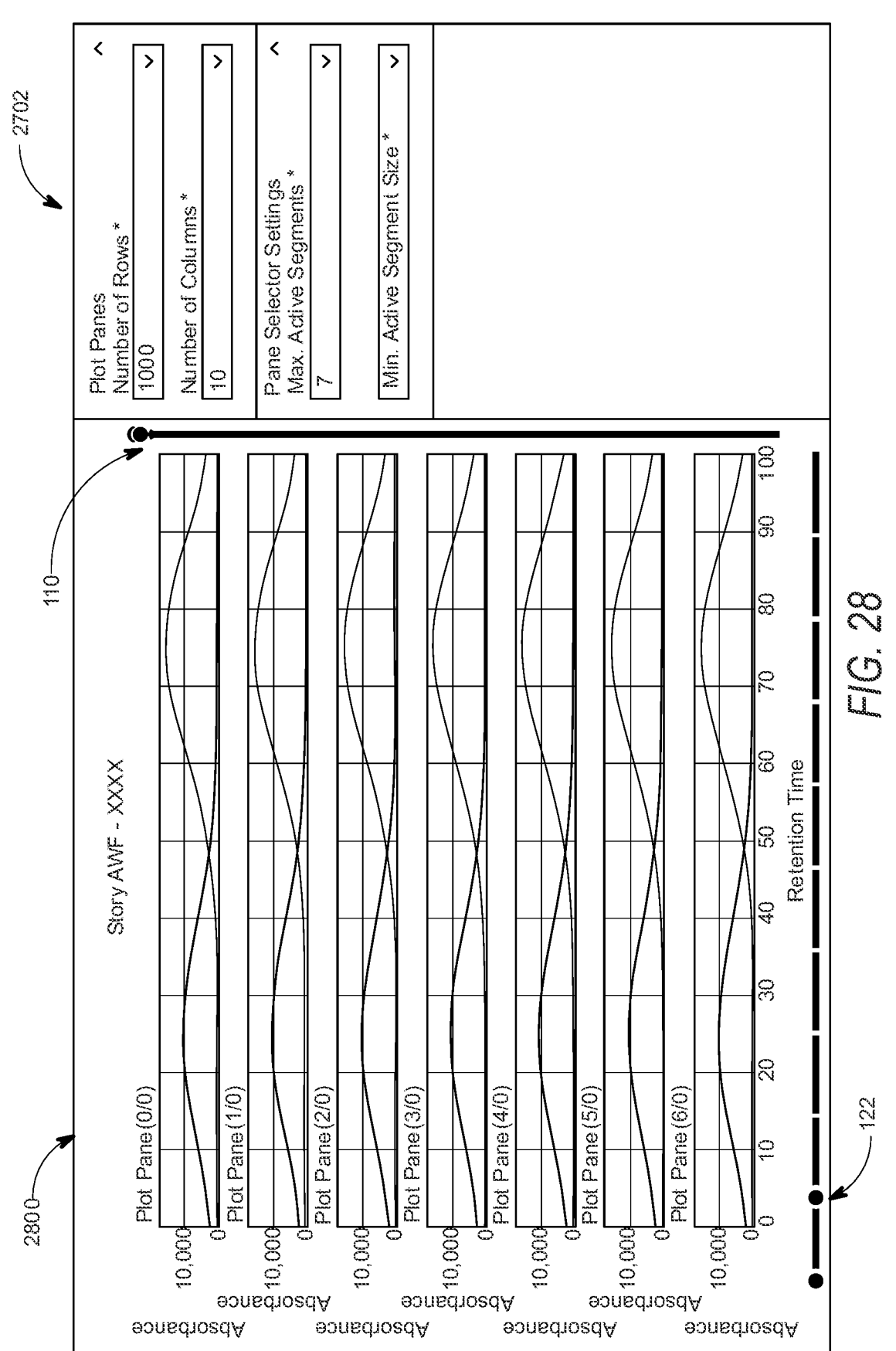
Figure 29:
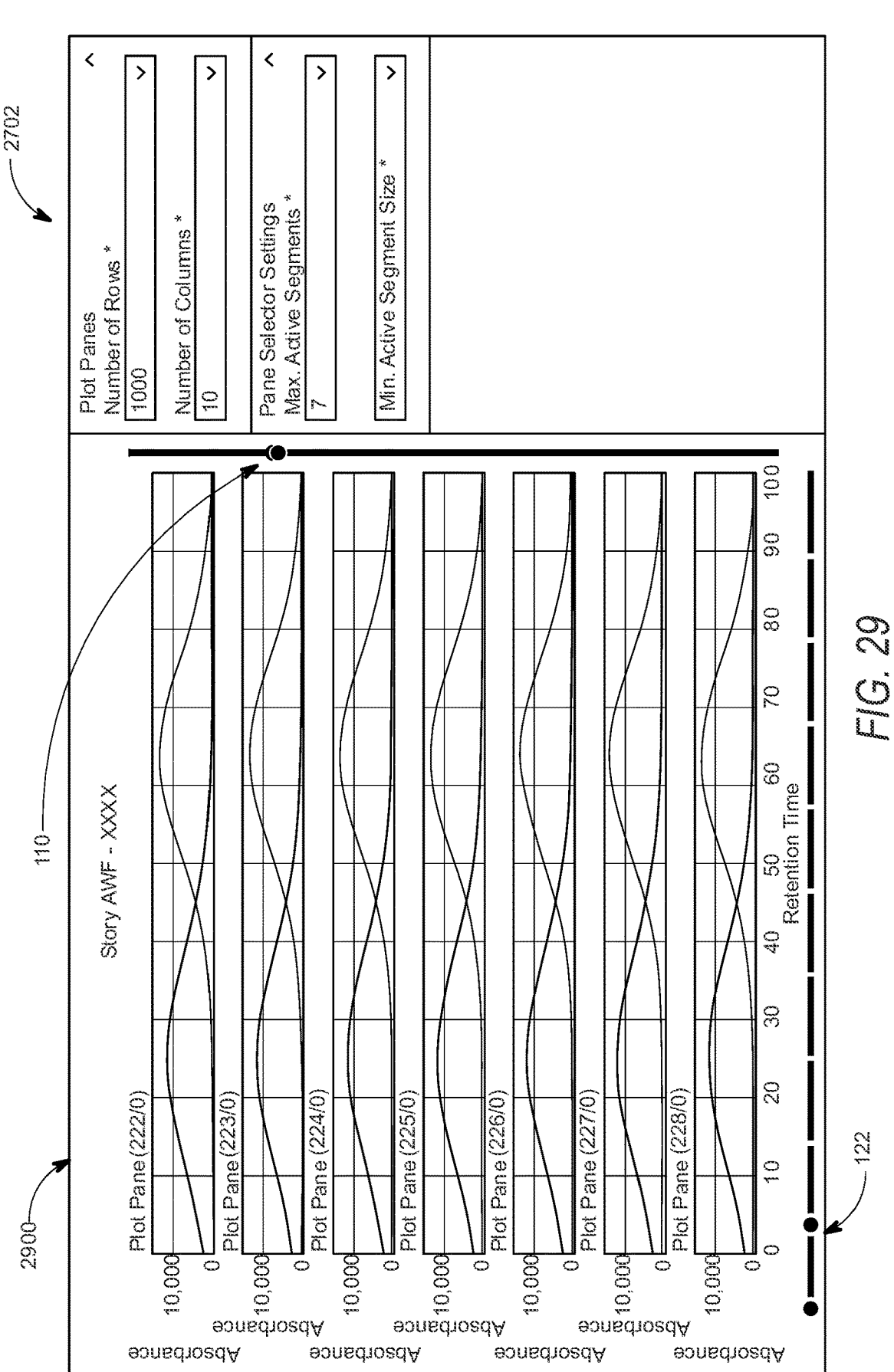
Figure 30:
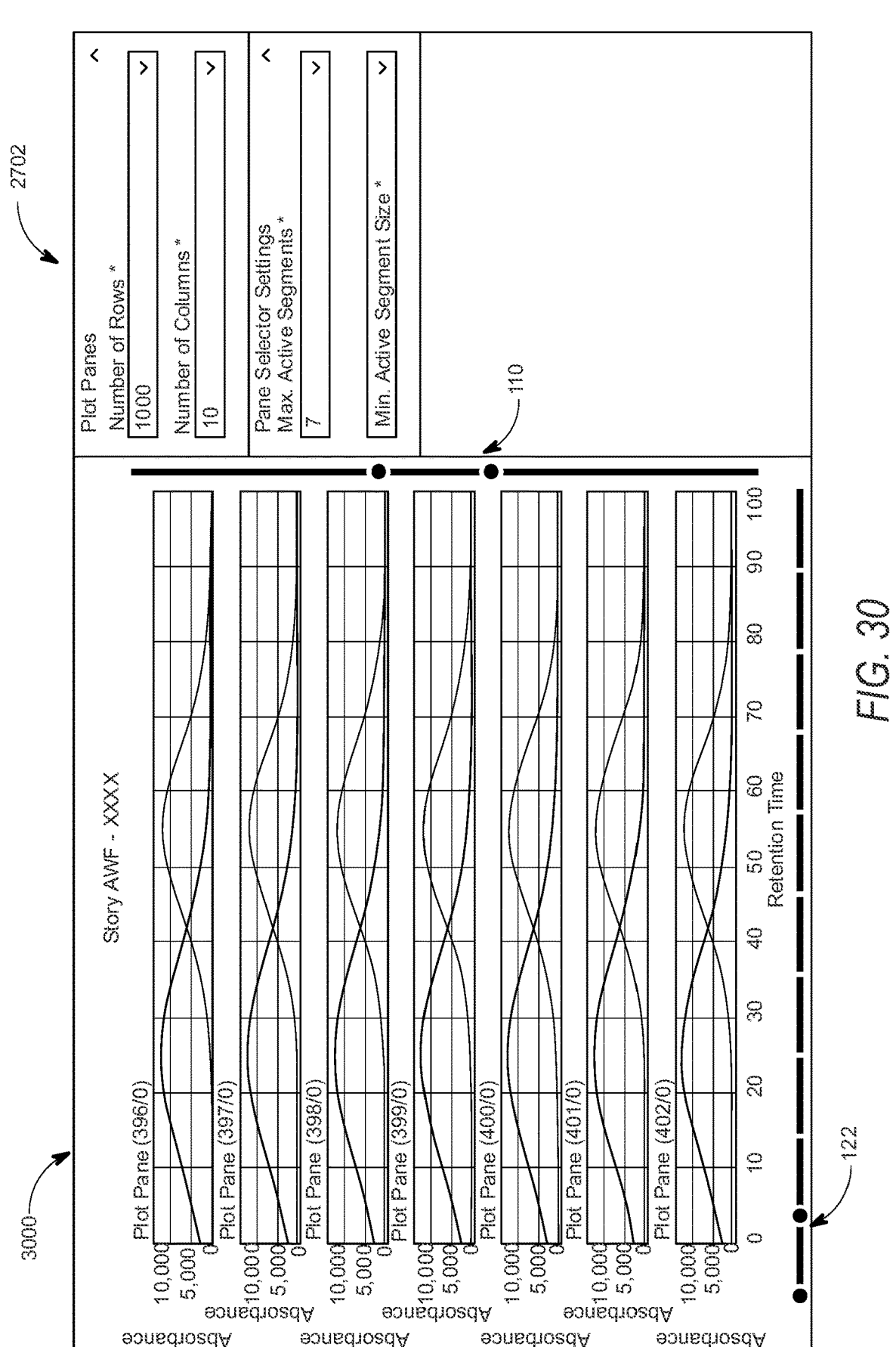
Figure 31:
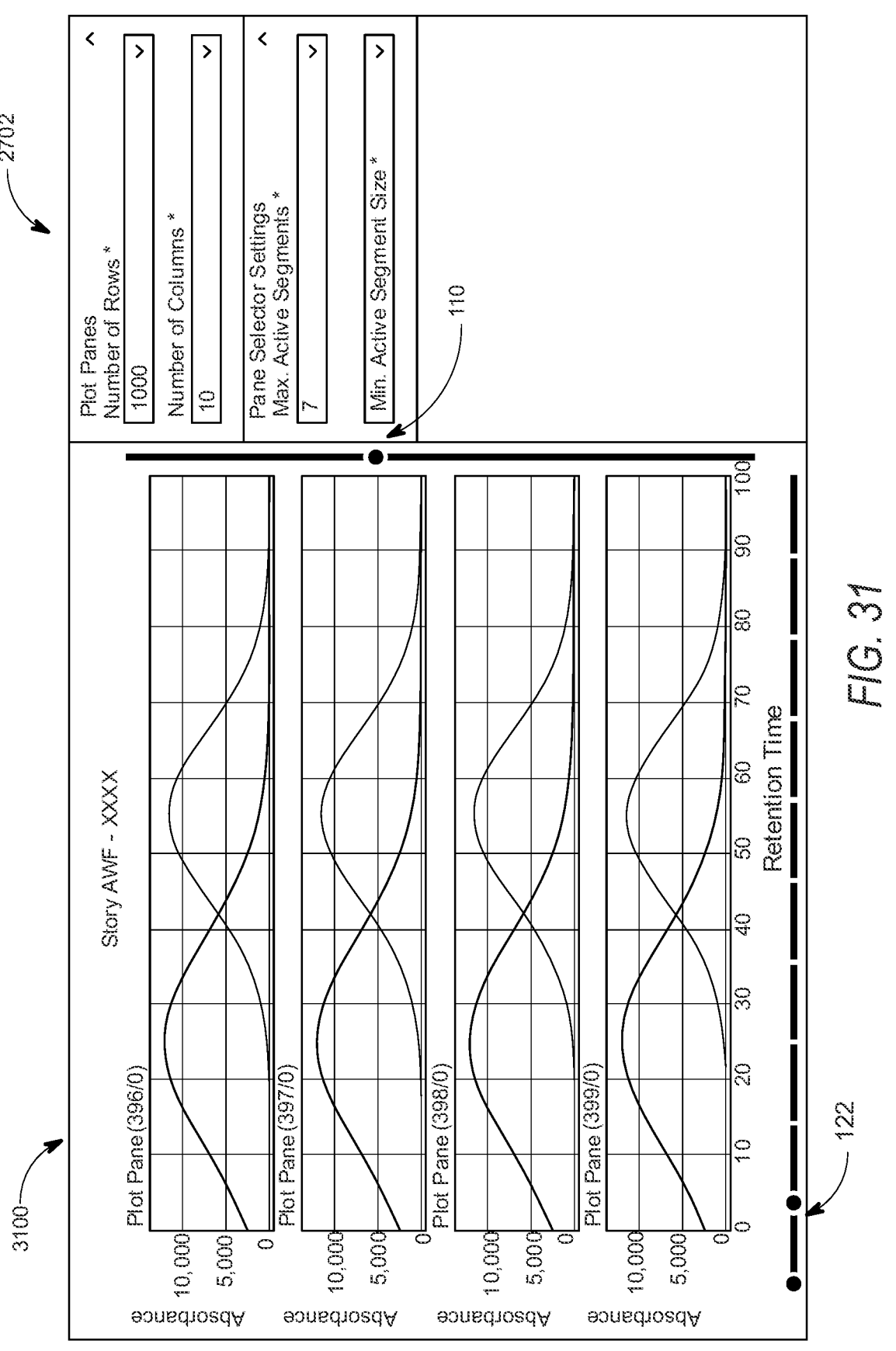

Referring to FIG. 27, the user interface display 2700 (e.g., of the display 118) shows details of a linear operation of the range selectors 110 and 122. As shown at 2702, a maximum number of rows of plot panes may be specified at 1000, and a maximum number of columns of plot panes may be specified at 10. Further, a maximum number of active segments may be specified at 7, with a minimum active segment size specified at 0. For these specifications, the range selector 110 is shown as including seven active segments (e.g., resulting in the seven rows of plot panes shown), and the range selector 122 is shown as including one active segment (resulting in the one column of plot panes shown). Based on the specification of the minimum active segment size of 0, as shown in FIGS. 27-30 with respect to user interface displays 2700-3000, irrespective of the movement, size increase, or size decrease of the range selector 110, seven rows of plot panes are shown, except in FIG. 31 that shows, in user interface display 3100, four rows of plot panes. This is because the specification of the minimum active segment size of zero may effectively result in a linear operation of the range selector 110 as shown in FIGS. 27-31. With the minimum size of active segment sizes being set to zero (e.g., no minimum size set), all of the segments (e.g., active and inactive) will have the same size, thus resulting in a linear operation of the range selector 110. Thus, the non-linear operation of the range selector 110 (and the range selector 122) as disclosed herein with reference to FIGS. 18-25 provides for the range selector 110 and the associated interactive elements 130 and 132 to remain fully functional.

Referring again to FIG. 1, with respect to the implementation of ordinal values as disclosed herein, the range selector controller 106 may receive, based on an increase or a decrease in the size 108 of the range selector 110, the selection of the range 112 of ordinal values 162 associated with plot panes from a plurality of available ordinal values 164 associated with plot panes to display the data 104. The display generator 116 may generate, based on the received selection of the range 112 of ordinal values 162, the display 118 of the data in plot panes included in the range 112 of ordinal values 162 associated with the plot panes. The size of the range selector 110 may be non-linearly proportional to the available ordinal values 164 associated with the plot panes to display the data 104. Further, the range selector 110 may represent a first range selector 110 to control display of a row of the plot panes included in the range 112 of ordinal values 162 associated with the plot panes. The range selector controller 106 may receive, based on an increase or a decrease in the size 120 of the second range selector 122, a selection of a column of plot panes included in another range 124 of ordinal values 152 associated with plot panes. The display generator 116 may generate, based on the received selection of the another range 124 of ordinal values 152 associated with the plot panes, a further display of the data in plot panes included in the another range of ordinal values 152 associated with the plot panes.

Thus, with respect to implementation of the ordinal values, the range selectors 110 and 122 may be utilized to select a relatively small range of ordinal values from a relatively large collection of ordinal values. In this regard, the range selectors 110 and 122 may be utilized to select an arbitrarily large range of ordinal values from a large collection of ordinal values. Alternatively or additionally, the range selectors 110 and 122 may be utilized to select continuous value ranges instead of ordinal value ranges. For example, assuming that for a collection of 1000 ordinal values and a range selector with an extent (e.g., specified range) of 200 pixels, since each pixel corresponds to five possible ordinal values, it may be technically challenging to precisely operate the associated interactive elements if the size of the range selectors 110 and/or 122 is linearly proportional to the available plot panes. Thus, with a non-linear range selector operation as disclosed herein, a precise selection of individual ordinal values may be performed for a variety of ordinal value ranges.

Figure 34:
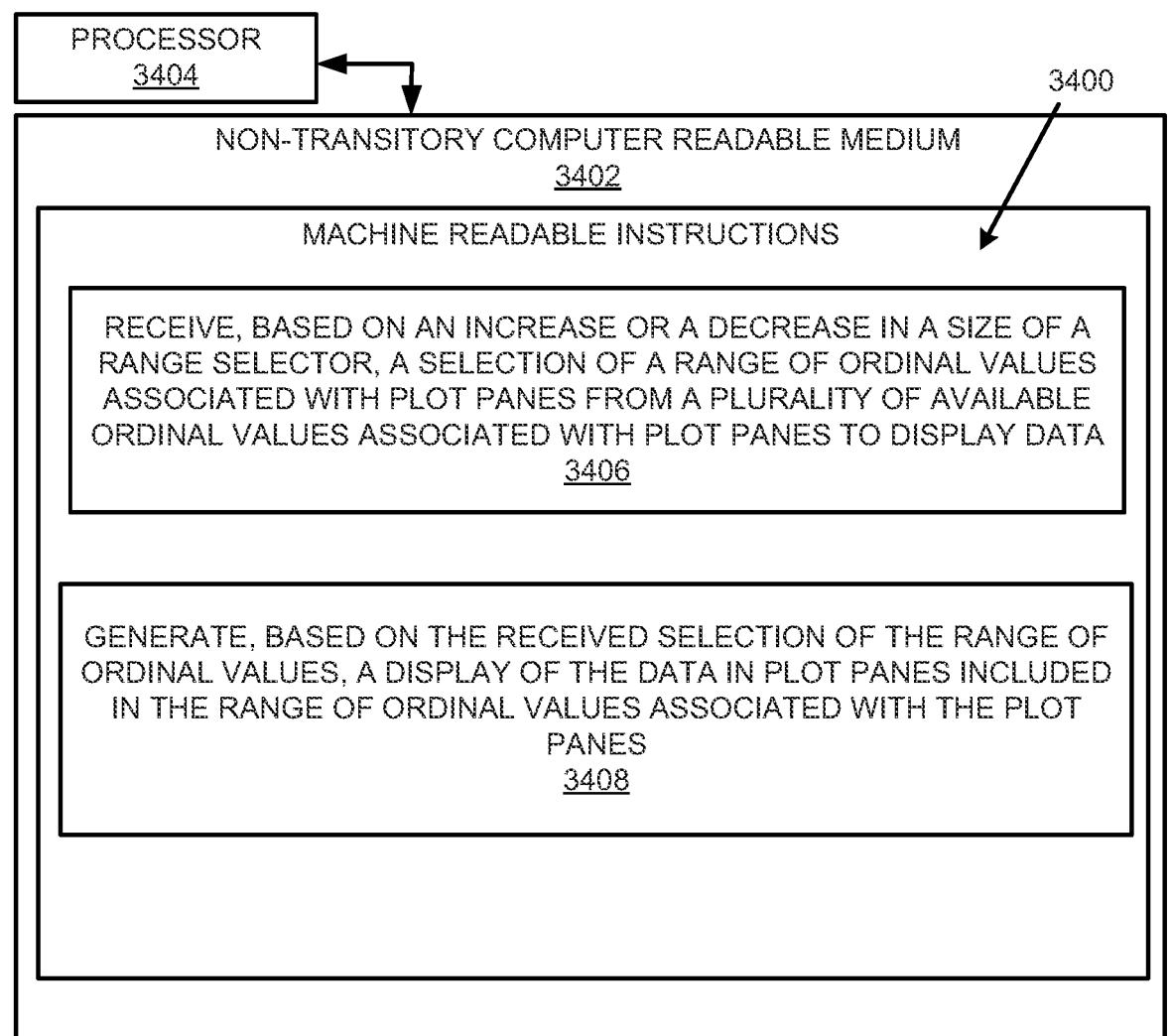
FIG. 34 illustrates another example block diagram for linear and non-linear range-based plot pane selection, in accordance with another example of the present disclosure.

FIGS. 32-34 respectively illustrate an example block diagram 3200, a flowchart of an example method 3300, and a further example block diagram 3400 for linear and non-linear range-based plot pane selection, according to examples. The block diagram 3200, the method 3300, and the block diagram 3400 may be implemented on the apparatus 100 described above with reference to FIG. 1 by way of example and not of limitation. The block diagram 3200, the method 3300, and the block diagram 3400 may be practiced in other apparatus. In addition to showing the block diagram 3200, FIG. 32 shows hardware of the apparatus 100 that may execute the instructions of the block diagram 3200. The hardware may include a processor 3202, and a memory 3204 storing machine readable instructions that when executed by the processor cause the processor to perform the instructions of the block diagram 3200. The memory 3204 may represent a non-transitory computer readable medium. FIG. 33 may represent an example method for linear and non-linear range-based plot pane selection, and the steps of the method. FIG. 34 may represent a non-transitory computer readable medium 3402 having stored thereon machine readable instructions to perform linear and non-linear range-based plot pane selection, according to an example. The machine readable instructions, when executed, cause a processor 3404 to perform the instructions of the block diagram 3400 also shown in FIG. 34.

The processor 3202 of FIG. 32, and the processor 3404 of FIG. 34 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 3402 of FIG. 34), such as hardware storage devices (e.g., RAM (random access memory), ROM (read only memory), EPROM (erasable, programmable ROM), EEPROM (electrically erasable, programmable ROM), hard drives, and flash memory). The memory 3204 may include a RAM, where the machine readable instructions and data for a processor may reside during runtime.

Referring to FIGS. 1-32, and particularly to the block diagram 3200 shown in FIG. 32, the memory 3204 may include instructions 3206 to receive data 104 that is to be displayed.

The processor 3202 may fetch, decode, and execute the instructions 3208 to receive, based on an increase or a decrease in a size 108 of a range selector 110, a selection of a range 112 of plot panes from a plurality of available plot panes 114 to display the data 104.

The processor 3202 may fetch, decode, and execute the instructions 3210 to generate, based on the received selection of the range 112 of plot panes, a display 118 of the data 104 in plot panes included in the range 112 of plot panes.

Referring to FIGS. 1-31 and 33, and particularly FIG. 33, for the method 3300, at block 3302, the method may include determining, by at least one hardware processor, a size 108 of a range selector 110.

At block 3304, the method may include receiving, by the at least one hardware processor, based on an increase or a decrease in the size 108 of the range selector 110, a selection of a range 112 of plot panes from a plurality of available plot panes 114 to display data 104.

At block 3306, the method may include generating, by the at least one hardware processor, based on the received selection of the range 112 of plot panes, a display 118 of the data 104 in plot panes included in the range 112 of plot panes.

Referring to FIGS. 1-32 and 34, and particularly FIG. 34, for the block diagram 3400, the non-transitory computer readable medium 3402 may include instructions 3406 to receive, based on an increase or a decrease in a size 108 of the range selector 110, a selection of a range 112 of ordinal values 162 associated with plot panes from a plurality of available ordinal values 164 associated with plot panes to display data 104.

The processor 3404 may include instructions 3408 to generate, based on the received selection of the range 112 of ordinal values 162, the display 118 of the data in plot panes included in the range 112 of ordinal values 162 associated with the plot panes.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:

at least one hardware processor; and a memory storing machine readable instructions that, when executed by the at least one hardware processor, cause the at least one hardware processor to:

receive data that is to be displayed;

receive, based on an increase or a decrease in a size of a range selector, a selection of a range of plot panes from a plurality of available plot panes to display the data; and generate, based on the received selection of the range of plot panes, a display of the data in plot panes included in the range of plot panes, wherein the size of the range selector is non-linearly proportional to the available plot panes to display the data, and wherein the display includes each plot plane separated by a gap from an adjacent plot pane.

2. The apparatus according to claim 1, wherein the range selector represents a first range selector to control display of a row of the plot panes included in the range of plot panes, further comprising machine readable instructions that, when executed by the at least one hardware processor, further cause the at least one hardware processor to:

receive, based on an increase or a decrease in a size of a second range selector, a selection of a column of plot panes included in another range of plot panes; and generate, based on the received selection of the another range of plot panes, a further display of the data in plot panes included in the another range of plot panes.

3. The apparatus according to claim 2, wherein the size of the second range selector is non-linearly proportional to the available plot panes to display the data with respect to the column of plot panes.

4. The apparatus according to claim 1, wherein the range selector includes oppositely displayed interactive elements that are movable away from each other to increase the size of the range selector or movable towards each other to decrease the size of the range selector.

5. The apparatus according to claim 4, wherein each interactive element of the interactive elements includes a circular configuration.

6. The apparatus according to claim 1, further comprising machine readable instructions that, when executed by the at least one hardware processor, further cause the at least one hardware processor to:

determine whether a maximum number of specified plot panes is less than or equal to a specified threshold; and based on a determination that the maximum number of specified plot panes is less than or equal to the specified threshold, specify the size of the range selector as linearly proportional to the available plot panes to display the data.

7. The apparatus according to claim 1, further comprising machine readable instructions that, when executed by the at least one hardware processor, further cause the at least one hardware processor to:

determine whether a maximum number of specified plot panes is greater than a specified threshold; and based on a determination that the maximum number of specified plot panes is greater than the specified threshold, specify the size of the range selector as non-linearly proportional to the available plot panes to display the data.

8. The apparatus according to claim 1, further comprising machine readable instructions that, when executed by the at least one hardware processor, further cause the at least one hardware processor to:

specify the non-linear proportionality of the size of the range selector by:

determining a minimum size for active segments associated with plot panes;

determining a transition area in a vicinity of active segments associated with the range of plot panes; and modifying, based on a comparison of a size of the active segments associated with the range of plot panes and a size of inactive segments to the minimum size for active segments associated with the plot panes, the transition area.

9. The apparatus according to claim 8, wherein the machine readable instructions to determine the minimum size for active segments associated with the plot panes, when executed by the at least one hardware processor, further cause the at least one hardware processor to:

determine the minimum size to enable a touch device based input from interactive elements of the range selector associated with the range of plot panes.

10. The apparatus according to claim 8, wherein the machine readable instructions to determine the minimum size for active segments associated with the plot panes, when executed by the at least one hardware processor, further cause the at least one hardware processor to:

determine the minimum size to enable a user contact based input from interactive elements of the range selector associated with the range of plot panes.

11. A computer implemented method comprising:

determining, by at least one hardware processor, a size of a range selector;

receiving, by the at least one hardware processor, based on an increase or a decrease in the size of the range selector, a selection of a range of plot panes from a plurality of available plot panes to display data; and generating, by the at least one hardware processor, based on the received selection of the range of plot panes, a display of the data in plot panes included in the range of plot panes, wherein the display includes each plot pane, of the plot panes included in the range of plot panes, sized based on the size of the range selector, and wherein the range selector is operable to perform at least one selection of a range of plot panes that excludes at least one plot pane included in the available plot panes.

12. The method according to claim 11, wherein determining, by the at least one hardware processor, the size of the range selector further comprises:

specifying, by the at least one hardware processor, the size of the range selector as non-linearly proportional to the available plot panes to display the data.

13. The method according to claim 11, wherein determining, by the at least one hardware processor, the size of the range selector further comprises:

determining, by the at least one hardware processor, whether a maximum number of specified plot panes is less than or equal to a specified threshold; and specifying, by the at least one hardware processor, based on a determination that the maximum number of specified plot panes is less than or equal to the specified threshold, the size of the range selector as linearly proportional to the available plot panes to display the data.

14. A non-transitory computer readable medium having stored thereon machine readable instructions that, when executed by at least one hardware processor, cause the at least one hardware processor to:

receive, based on an increase or a decrease in a size of a range selector, a selection of a range of ordinal values associated with plot panes from a plurality of available ordinal values associated with plot panes to display data; and generate, based on the received selection of the range of ordinal values, a display of the data in plot panes included in the range of ordinal values associated with the plot panes, wherein the display includes each plot pane, of the plot panes included in the range of ordinal values associated with the plot panes, sized based on the size of the range selector, and wherein the range selector is operable to perform at least one selection of a range of ordinal values that excludes at least one ordinal value included in the available ordinal values.

15. The non-transitory computer readable medium according to claim 14, wherein the size of the range selector is non-linearly proportional to the available ordinal values associated with the plot panes to display the data.

16. The non-transitory computer readable medium according to claim 14, wherein the range selector represents a first range selector to control display of a row of the plot panes included in the range of ordinal values associated with the plot panes, and wherein the machine readable instructions, when executed by the at least one hardware processor, further cause the at least one hardware processor to:

receive, based on an increase or a decrease in a size of a second range selector, a selection of a column of plot panes included in another range of ordinal values associated with plot panes; and generate, based on the received selection of the another range of ordinal values associated with the plot panes, a further display of the data in plot panes included in the another range of ordinal values associated with the plot panes.

17. The non-transitory computer readable medium according to claim 14, wherein the machine readable instructions, when executed by the at least one hardware processor, further cause the at least one hardware processor to:

determine whether a maximum number of specified ordinal values associated with plot panes is less than or equal to a specified threshold; and based on a determination that the maximum number of specified ordinal values associated with the plot panes is less than or equal to the specified threshold, specify the size of the range selector as linearly proportional to the available ordinal values associated with plot panes to display the data.

18. The non-transitory computer readable medium according to claim 14, wherein the machine readable instructions, when executed by the at least one hardware processor, further cause the at least one hardware processor to:

determine whether a maximum number of specified ordinal values associated with plot panes is greater than a specified threshold; and based on a determination that the maximum number of specified ordinal values associated with the plot panes is greater than the specified threshold, specify the size of the range selector as non-linearly proportional to the available ordinal values associated with plot panes to display the data.

19. The non-transitory computer readable medium according to claim 14, wherein the machine readable instructions, when executed by the at least one hardware processor, further cause the at least one hardware processor to:

specify a non-linear proportionality of the size of the range selector by:

determining a minimum size for active segments associated with plot panes;

determining a transition area in a vicinity of active segments associated with the range of ordinal values associated with the plot panes; and modifying, based on a comparison of a size of the active segments associated with the range of ordinal values associated with the plot panes and a size of inactive segments to the minimum size for active segments associated with the plot panes, the transition area.

20. The non-transitory computer readable medium according to claim 19, wherein the machine readable instructions to determine the minimum size for active segments associated with the plot panes, when executed by the at least one hardware processor, further cause the at least one hardware processor to:

determine the minimum size to at least one of:

enable a touch device based input from interactive elements of the range selector associated with the range of ordinal values associated with the plot panes, or enable a user contact based input from interactive elements of the range selector associated with the range of ordinal values associated with the plot panes.

* * * * *